(12) United States Patent
LeMay et al.

(10) Patent No.: US 12,705,057 B2
(45) Date of Patent: Aug. 11, 2026

(54) CIRCUITRY AND METHODS FOR IMPLEMENTING CAPABILITIES USING NARROW REGISTERS

(71) Applicant: Intel Corporation, Santa Clara, CA (US)

(72) Inventors: Michael LeMay, Hillsboro, OR (US); Jason W. Brandt, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 88 days.

(21) Appl. No.: 17/553,629

(22) Filed: Dec. 16, 2021

(65) Prior Publication Data

US 2023/0195461 A1 Jun. 22, 2023

(51) Int. Cl.
*G06F 9/30* (2018.01)

(52) U.S. Cl.
CPC ...... *G06F 9/30145* (2013.01); *G06F 9/30043* (2013.01); *G06F 9/30101* (2013.01)

(58) Field of Classification Search
CPC .................................................. G06F 9/30043
See application file for complete search history.

(56) References Cited

U.S. PATENT DOCUMENTS 3,916,385 A 10/1975 Parmar et al.
4,809,160 A 2/1989 Mahon et al.
4,821,169 A 4/1989 Sites et al.
5,809,564 A 9/1998 Craze et al.
6,009,503 A 12/1999 Liedtke
6,048,940 A 4/2000 Blaedel et al.
(Continued)

FOREIGN PATENT DOCUMENTS

EP 0428079 A2 5/1991
JP 03-244054 A 10/1991
WO 2007/079011 A3 11/2007

OTHER PUBLICATIONS

Advisory Action from U.S. Appl. No. 11/323,446, Apr. 17, 2012, 3 pages.

(Continued)

*Primary Examiner* — Michael J Metzger
(74) *Attorney, Agent, or Firm* — NICHOLSON DE VOS WEBSTER & ELLIOTT LLP

(57) ABSTRACT

Systems, methods, and apparatuses for implementing capabilities using narrow registers are described. In certain examples, a hardware processor core comprises a capability management circuit to check a capability for a memory access request, the capability comprising an address field, a validity field, and a bounds field that is to indicate a lower bound and an upper bound of an address space to which the capability authorizes access; a decoder circuit to decode a single instruction into a decoded single instruction, the single instruction comprising fields to indicate a memory address that stores the capability and a single destination register, and an opcode to indicate that an execution circuit is to load a first proper subset of the capability from the memory address into the single destination register and load a second proper subset of the capability from the memory address into an implicit second destination register; and the execution circuit to execute the decoded single instruction according to the opcode.

21 Claims, 20 Drawing Sheets

(56) References Cited

U.S. PATENT DOCUMENTS

| | | | |
|---|---|---|---|
| 6,671,699 B1 | 12/2003 | Black et al. | |
| 6,694,450 B1 | 2/2004 | Kidder et al. | |
| 6,823,433 B1 | 11/2004 | Barnes et al. | |
| 7,401,234 B2 | 7/2008 | Case et al. | |
| 8,554,984 B2 | 10/2013 | Yano et al. | |
| 8,595,442 B1 | 11/2013 | James-Roxby et al. | |
| 9,026,866 B2 | 5/2015 | Balasubramanian | |
| 9,390,031 B2 | 7/2016 | Durham et al. | |
| 9,436,847 B2 | 9/2016 | Durham et al. | |
| 9,652,375 B2 | 5/2017 | Stark et al. | |
| 10,162,694 B2 | 12/2018 | Stark et al. | |
| 2004/0031030 A1 | 2/2004 | Kidder et al. | |
| 2004/0158775 A1 | 8/2004 | Shibuya et al. | |
| 2005/0193217 A1 | 9/2005 | Case et al. | |
| 2006/0187941 A1 | 8/2006 | Andersen | |
| 2006/0256877 A1 | 11/2006 | Szczepanek et al. | |
| 2006/0256878 A1 | 11/2006 | Szczepanek et al. | |
| 2007/0055837 A1 | 3/2007 | Rajagopal et al. | |
| 2008/0209282 A1 | 8/2008 | Lee et al. | |
| 2009/0271536 A1 | 10/2009 | Tiennot | |
| 2009/0292977 A1 | 11/2009 | Bradley et al. | |
| 2010/0162038 A1 | 6/2010 | Hulbert et al. | |
| 2013/0318322 A1 | 11/2013 | Shetty et al. | |
| 2013/0326288 A1 | 12/2013 | Datta et al. | |
| 2014/0115283 A1 | 4/2014 | Radovic et al. | |
| 2014/0281354 A1 | 9/2014 | Tkacik et al. | |
| 2014/0372698 A1 | 12/2014 | Lee et al. | |
| 2016/0048378 A1 | 2/2016 | Varma | |
| 2016/0124802 A1 | 5/2016 | Gabor et al. | |
| 2016/0259682 A1 | 9/2016 | Stark et al. | |
| 2016/0283300 A1 | 9/2016 | Stark et al. | |
| 2016/0371139 A1 | 12/2016 | Stark et al. | |
| 2017/0177429 A1 | 6/2017 | Stark et al. | |
| 2018/0060250 A1 | 3/2018 | Hildesheim et al. | |
| 2018/0074715 A1 | 3/2018 | Farmahini-Farahani et al. | |
| 2018/0225120 A1* | 8/2018 | Barnes | G06F 21/52 |
| 2018/0246722 A1* | 8/2018 | Plotnikov | G06F 9/30138 |
| 2020/0004953 A1 | 1/2020 | Lemay et al. | |
| 2021/0109760 A1* | 4/2021 | Muller | G06F 9/30145 |
| 2021/0200546 A1 | 7/2021 | Lemay et al. | |
| 2021/0294607 A1* | 9/2021 | Abhishek Raja | G06F 9/30043 |
| 2023/0085143 A1* | 3/2023 | Smith | G06F 9/3016 712/208 |

OTHER PUBLICATIONS

Angelo-Oracle. "SPARC M7 Chip-32 cores", Oracle.com, Aug. 15, 2014. Web. Accessed Dec. 21, 2015. 8 pages. URL: <http://blogs.oracle.com/rajadurai/entry/sparc_m7_chip_32_cores>.

Arm, "Arm® Architecture Reference Manual Supplement Morello for A-profile Architecture", Document No. DDI0606, Document Version: A.j, 2019-2021, 1288 pages.

BIIN: "CPA Architecture Reference Manual", 1988, 401 pages.

Burow et al., "CUP: Comprehensive User-Space Protection for C/C++", Session 9: Software Security, ASIACCS'18, Jun. 4-8, 2018, pp. 381-392.

Carr et al., "DataShield: Configurable Data Confidentiality and Integrity", ASIA CCS '17, Apr. 2-6, 2017, pp. 193-204.

Chen et al., "Shreds: Fine-grained Execution Units with Private Memory", IEEE Symposium on Security and Privacy, 2016, pp. 56-71.

Cheri, "Capability Hardware Enhanced RISC Instructions (CHERI)", available online at <https://www.cl.cam.ac.uk/research/security/ctsrd/cheri/>, 2010-2019, 2 pages.

Dartmouth, "ELFbac: Runtime Intent-Level ABI-Granular Memory Protection for Linux", available online at <https://www.cs.dartmouth.edu/~sergey/io/elfbac/>, retrieved on May 1, 2020, 1 page.

Duarte, "Memory Translation and Segmentation" Aug. 2008, p. 1-7.

Duck et al., "EffectiveSan: Type and Memory Error Detection using Dynamically Typed C/C++", PLDI'18, Jun. 18-22, 2018, pp. 181-195.

Final Office Action from U.S. Appl. No. 11/323,446, Dec. 30, 2011, 18 pages.

Final Office Action from U.S. Appl. No. 11/323,446, Jan. 17, 2013, 17 pages.

Final Office Action from U.S. Appl. No. 11/323,446, Jul. 16, 2015, 17 pages.

Final Office Action from U.S. Appl. No. 11/323,446, Jul. 28, 2014, 16 pages.

Final Office Action from U.S. Appl. No. 11/323,446, Jul. 7, 2009, 21 pages.

Final Office Action from U.S. Appl. No. 11/323,446, Oct. 15, 2010, 17 pages.

Final Office Action from U.S. Appl. No. 11/323,446, Sep. 20, 2013, 14 pages.

Gil et al., "There's a Hole in the Bottom of the C: On the Effectiveness of Allocation Protection", IEEE Cybersecurity Development (SecDev), Sep. 30-Oct. 2, 2018, 8 pages.

Gove, D., et al., "Detecting memory access errors," Nov. 25, 2015, 17 pages.

Gretton-Dann et al., "Arm A-Profile Architecture Developments 2018: Armv8.5-A", available online at <https://community.arm.com/developer/ip-products/processors/b/processors-ip-blog/posts/arm-a-profile-architecture-2018-developments-armv85a>, Sep. 17, 2018, 5 pages.

https://courses.cs.washington.edu/courses/cse351/17wi/lectures/CSE351-L02-memory-L17wi.pdfAuthor: Ceze; Title: CSE351:Memory, Data, & Addressing I, Date: Winter, 2017 (Year: 2017).

Intel, "Intel 64 and IA-32 Architectures Software Developer's Manual", vol. 3A, System Programming Guide, Part 1, Order No. 253668-060US, Sep. 2016, 468 pages.

International Preliminary Report on Patentability for Application No. PCT/US2006/048940, Jul. 1, 2008, 8 pages.

International Search Report and Written Opinion for Application No. PCT/US2006/048940, Sep. 25, 2007, 15 pages.

International Search Report and Written Opinion for Application No. PCT/US2016/063211, Mar. 7, 2017, 11 pages.

Introduction to SPARC M7 and Silicon Secured Memory (SSM), Retrieved from https://swisdev.oracle.com/_files/What-Is-SSM.html on Jul. 4, 2016, 2 pages.

Jeon et a., "HexType: Efficient Detection of Type Confusion Errors for C++", CCS '17, Session K3: Program Analysis, Oct. 2017, pp. 2373-2387.

Kwon et al., "Low-Fat Pointers: Compact Encoding and Efficient Gate-Level Implementation of Fat Pointers for Spatial Safety and Capability-based Security", Proceedings of the 2013 ACM SIGSAC Conference on Computer & Communications Security, 2013, pp. 721-732.

Liljestrand et al., "PAC it up: Towards Pointer Integrity using ARM Pointer Authentication", Cornell University, Nov. 22, 2018, 21 pages.

LogMeIn Support, "What is Privilege Separation in SSH?", available online at <https://web.archive.org/web/20191218064501/https://help.logmein.com/articles/en_US/FAQ/What-is-Privilege-Separation-in-SSH-en1>, Dec. 18, 2019, 1 page.

M. Rutland, "ARMv8.3 Pointer Authentication",, Linux Security Summit, Sep. 14, 2017, 24 slides.

Mahon M.J., et al., "Hewlett-Packard Precision Architecture: The Processor," Hewlett-Packard Journal, Aug. 1986, 19 pages.

McIlroy et al., "Spectre is Here to Stay: An Analysis of Side-Channels and Speculative Execution", Cornell University, Feb. 15, 2019, pp. 1-26.

Menon et al., "Shakti-T: A RISC-V Processor with Light Weight Security Extensions", Conference: the Hardware and Architectural Support for Security and Privacy, Jun. 25, 2017, 9 pages.

Miller, Matt, "Trends, Challenges, and Strategic Shifts in the Software Vulnerability Mitigation Landscape", Microsoft Security Response Center (MSRC), Feb. 7, 2019, 32 pages.

Min R., et al., "Improving Performance of Large Physically Indexed Caches by Decoupling Memory Addresses From Cache Addresses," IEEE Transactions on Computers, vol. 50, No. 11, Nov. 2001, pp. 1191-1201.

Nagarakatte et al., "CETS: Compiler-Enforced Temporal Safety for C", ISMM'10, Jun. 5-6, 2010, pp. 31-40.

(56) References Cited

OTHER PUBLICATIONS

Non-Final Office Action from U.S. Appl. No. 11/323,446, Apr. 23, 2010, 16 pages.
Non-Final Office Action from U.S. Appl. No. 11/323,446, Jan. 15, 2015, 18 pages.
Non-Final Office Action from U.S. Appl. No. 11/323,446, Jun. 22, 2012, 16 pages.
Non-Final Office Action from U.S. Appl. No. 11/323,446, Jun. 7, 2013, 18 pages.
Non-Final Office Action from U.S. Appl. No. 11/323,446, Mar. 15, 2011, 16 pages.
Non-Final Office Action from U.S. Appl. No. 11/323,446, Mar. 20, 2014, 15 pages.
Non-Final Office Action from U.S. Appl. No. 11/323,446, Nov. 5, 2015, 5 pages.
Non-Final Office Action from U.S. Appl. No. 11/323,446, Oct. 7, 2008, 17 pages.
Non-Final Office Action, U.S. Appl. No. 16/729,358, Sep. 16, 2020, 17 pages.
Notice of Allowance from U.S. Appl. No. 11/323,446, Mar. 14, 2016, 5 pages.
Notice of Allowance, U.S. Appl. No. 16/729,358, Jul. 6, 2021, 8 pages.
Qualcomm, "Pointer Authentication on ARMv8.3: Design and Analysis of the New Software Security Instructions", Jan. 2017, 12 pages.
Office Action, EP App. No. 22206017.0, Jan. 15, 2024, 4 pages.
European Search Report and Search Opinion, EP App. No. 22206017.0, Apr. 17, 2023, 10 pages.
Korashy, A. E., et al., "A Formal Model for Capability Machines—An Illustrative Case Study towards Secure Compilation to CHERI", Master Thesis, Sep. 30, 2016, 99 pages.
Watson, R. N. M., et al., "Capability Hardware Enhanced RISC Instructions: CHERI Instruction—Set Architecture (Version 6)", Technical Report, Apr. 2017, 307 pages.
Serebryany et al., "AddressSanitizer: A Fast Address Sanity Checker", 2012 Usenix Annual Technical Conference, Jun. 13-15, 2012, 10 pages.
Serebryany et al., "Memory Tagging and How It Improves C/C++ Memory Safety", Feb. 2018, 14 pages.
Serebryany et al., "Memory Tagging: How It Improves C/C++ Memory Safety" Google, LLVM Developers' Meeting, Oct. 2018, 29 slides.
Serebryany, Kostya, "Security: ARM Memory Tagging Extension and How It Improves C/C++ Memory Safety", vol. 44, No. 2, Summer 2019, pp. 12-16.
Suh et al., "Secure Program Execution via Dynamic Information Flow Tracking", ASPLOS'04, Oct. 9-13, 2004, pp. 85-96.
T. Nyman et al., "HardScope: Thwarting DOP attacks with Hardware-Assisted Run-time Scope Enforcement", May 2017, pp. 1-20.
The Chromium Projects, "Multi-Process Architecture", available online at <https://web.archive.org/web/20191030200549/https://www.chromium.org/developers/design-documents/multi-process-architecture>, Oct. 30, 2019, 2 pages.
Tsampas et al., "Towards Automatic Compartmentalization of C Programs on Capability Machines", In Proceedings of the International Conference on Foundations of Computer Science, 2017, 14 pages.
Vasilakis et al., "BreakApp: Automated, Flexible Application Compartmentalization", Network and Distributed Systems Security (NDSS) Symposium, Feb. 18-21, 2018, 15 pages.
Watson et al., "An Introduction to CHERI", University of Cambridge, Computer Laboratory, Technical Report, No. 941, Sep. 2019, 43 pages.
Watson et al., "Capability Hardware Enhanced RISC Instructions: CHERI Instruction- Set Architecture (Version 8)", University of Cambridge, Computer Laboratory, Technical Report, No. 951, Oct. 2020, 590 pages.
Watson et al., "CHERI: A Hybrid Capability-System Architecture for Scalable Software Compartmentalization", IEEE Symposium on Security and Privacy, 2015, pp. 20-37.
Watson, "Capsicum: Practical capabilities for UNIX", USENIX Security, 2010, 17 pages.
Wesley et al., "Cornucopia: Temporal Safety for CHERI Heaps", . In Proceedings of the 41st IEEE Symposium on Security and Privacy, 2020, pp. 1507-1524.
Wilkes J., et al., "A Comparison of Protection Lookaside Buffers and the PA-RISC Protection Architecture," Mar. 1992, Hewlett-Packard, 12 pages.
Xia et al., "CHERIvoke: Characterising Pointer Revocation using CHERI Capabilities for Temporal Memory Safety", MICRO '52, Oct. 2019, pp. 545-557.

* cited by examiner

500

700

FETCH A SINGLE INSTRUCTION COMPRISING FIELDS TO INDICATE A MEMORY ADDRESS TO STORE A CAPABILITY AND A SINGLE SOURCE REGISTER, AND AN OPCODE TO INDICATE THAT AN EXECUTION CIRCUIT IS TO STORE A FIRST PROPER SUBSET OF AN ADDRESS FIELD AND A BOUNDS FIELD OF THE CAPABILITY FROM THE SINGLE SOURCE REGISTER TO THE MEMORY ADDRESS AND A SECOND PROPER SUBSET OF THE ADDRESS FIELD AND THE BOUNDS FIELD OF THE CAPABILITY FROM AN IMPLICIT SECOND SOURCE REGISTER TO THE MEMORY ADDRESS 702

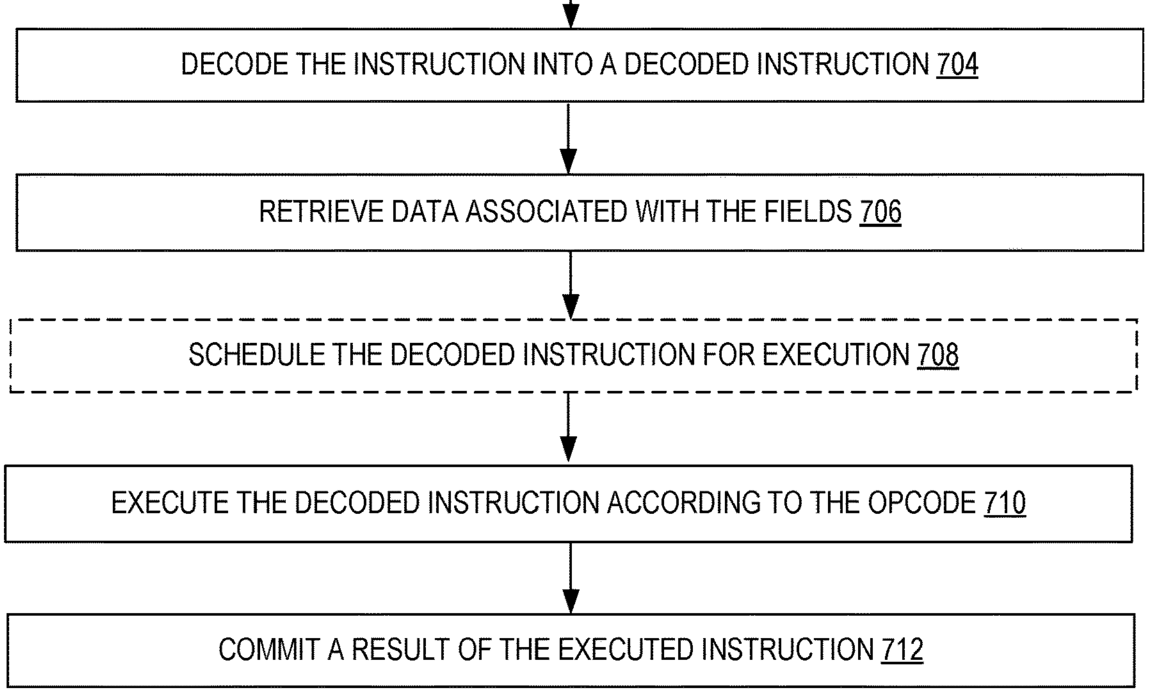

FIG. 7

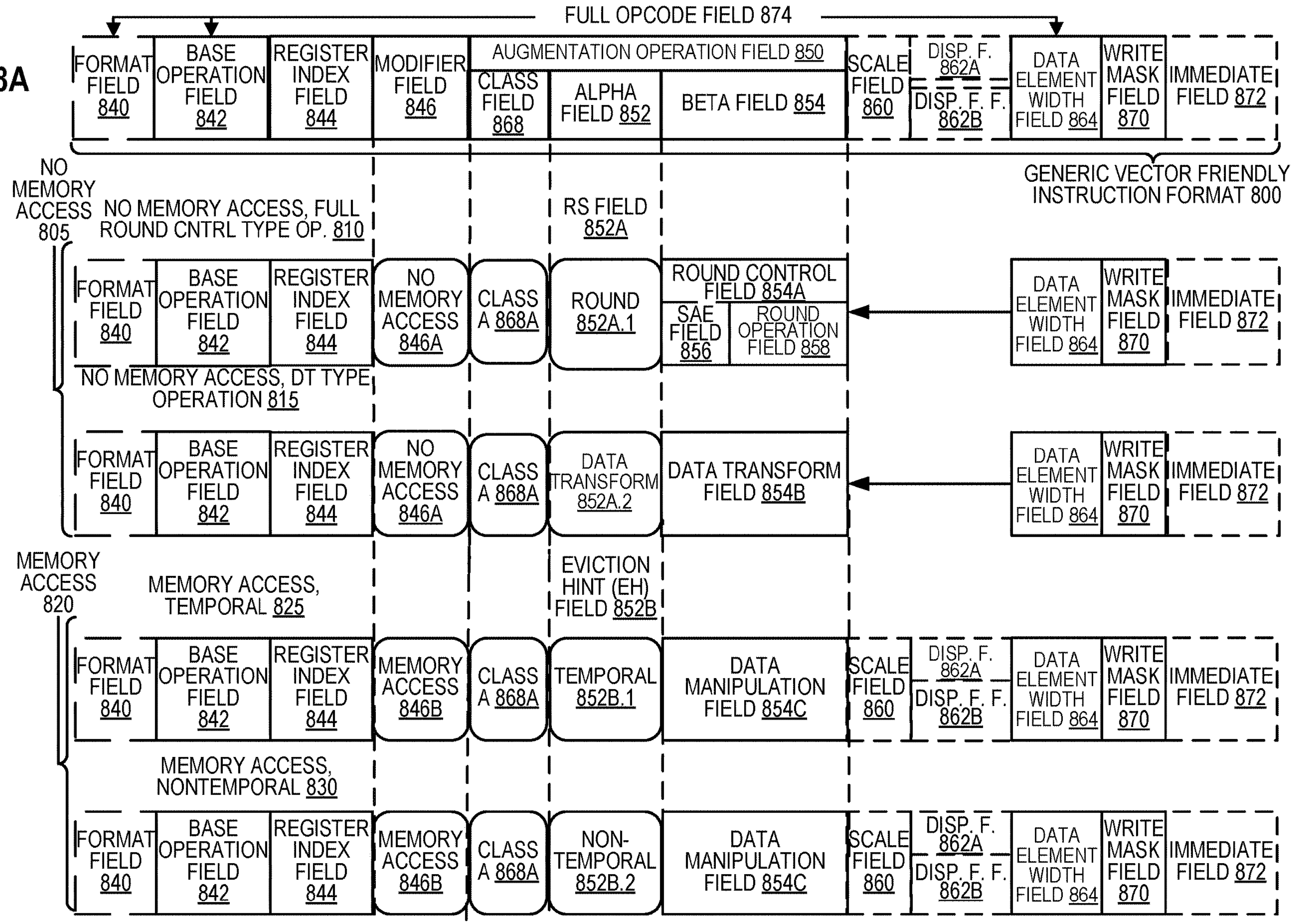
FIG.8A
FULL OPCODE FIELD 874
FORMAT FIELD 840
BASE OPERATION FIELD 842
REGISTER INDEX FIELD 844
MODIFIER FIELD 846
AUGMENTATION OPERATION FIELD 850
CLASS FIELD 868
ALPHA FIELD 852
BETA FIELD 854
SCALE FIELD 860
DISP. F. 862A
DISP. F. F. 862B
DATA ELEMENT WIDTH FIELD 864
WRITE MASK FIELD 870
IMMEDIATE FIELD 872
GENERIC VECTOR FRIENDLY INSTRUCTION FORMAT 800
NO MEMORY ACCESS 805
NO MEMORY ACCESS, FULL ROUND CNTRL TYPE OP. 810
RS FIELD 852A
NO MEMORY ACCESS 846A
CLASS A 868A
ROUND 852A.1
ROUND CONTROL FIELD 854A
SAE FIELD 856
ROUND OPERATION FIELD 858
NO MEMORY ACCESS, DT TYPE OPERATION 815
DATA TRANSFORM 852A.2
DATA TRANSFORM FIELD 854B
MEMORY ACCESS 820
MEMORY ACCESS, TEMPORAL 825
EVICTION HINT (EH) FIELD 852B
MEMORY ACCESS 846B
TEMPORAL 852B.1
DATA MANIPULATION FIELD 854C
MEMORY ACCESS, NONTEMPORAL 830
NON-TEMPORAL 852B.2

FIG. 8B

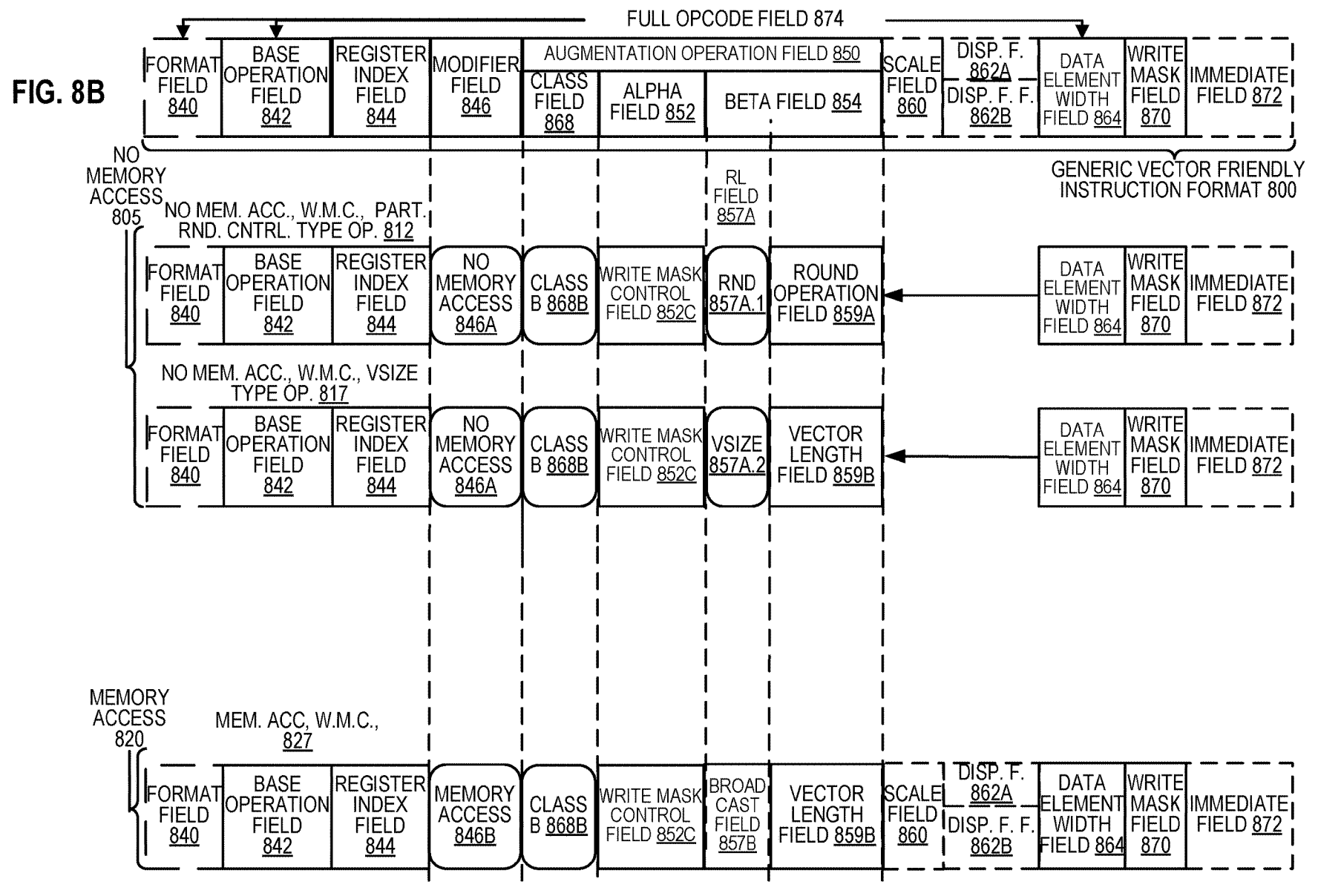

FULL OPCODE FIELD 874

FORMAT FIELD 840
BASE OPERATION FIELD 842
REGISTER INDEX FIELD 844
MODIFIER FIELD 846
AUGMENTATION OPERATION FIELD 850
CLASS FIELD 868
ALPHA FIELD 852
BETA FIELD 854
SCALE FIELD 860
DISP. F. 862A
DISP. F. F. 862B
DATA ELEMENT WIDTH FIELD 864
WRITE MASK FIELD 870
IMMEDIATE FIELD 872

GENERIC VECTOR FRIENDLY INSTRUCTION FORMAT 800

NO MEMORY ACCESS 805

NO MEM. ACC., W.M.C., PART. RND. CNTRL. TYPE OP. 812

RL FIELD 857A

FORMAT FIELD 840
BASE OPERATION FIELD 842
REGISTER INDEX FIELD 844
NO MEMORY ACCESS 846A
CLASS B 868B
WRITE MASK CONTROL FIELD 852C
RND 857A.1
ROUND OPERATION FIELD 859A
DATA ELEMENT WIDTH FIELD 864
WRITE MASK FIELD 870
IMMEDIATE FIELD 872

NO MEM. ACC., W.M.C., VSIZE TYPE OP. 817

FORMAT FIELD 840
BASE OPERATION FIELD 842
REGISTER INDEX FIELD 844
NO MEMORY ACCESS 846A
CLASS B 868B
WRITE MASK CONTROL FIELD 852C
VSIZE 857A.2
VECTOR LENGTH FIELD 859B
DATA ELEMENT WIDTH FIELD 864
WRITE MASK FIELD 870
IMMEDIATE FIELD 872

MEMORY ACCESS 820

MEM. ACC, W.M.C., 827

FORMAT FIELD 840
BASE OPERATION FIELD 842
REGISTER INDEX FIELD 844
MEMORY ACCESS 846B
CLASS B 868B
WRITE MASK CONTROL FIELD 852C
BROAD CAST FIELD 857B
VECTOR LENGTH FIELD 859B
SCALE FIELD 860
DISP. F. 862A
DISP. F. F. 862B
DATA ELEMENT WIDTH FIELD 864
WRITE MASK FIELD 870
IMMEDIATE FIELD 872

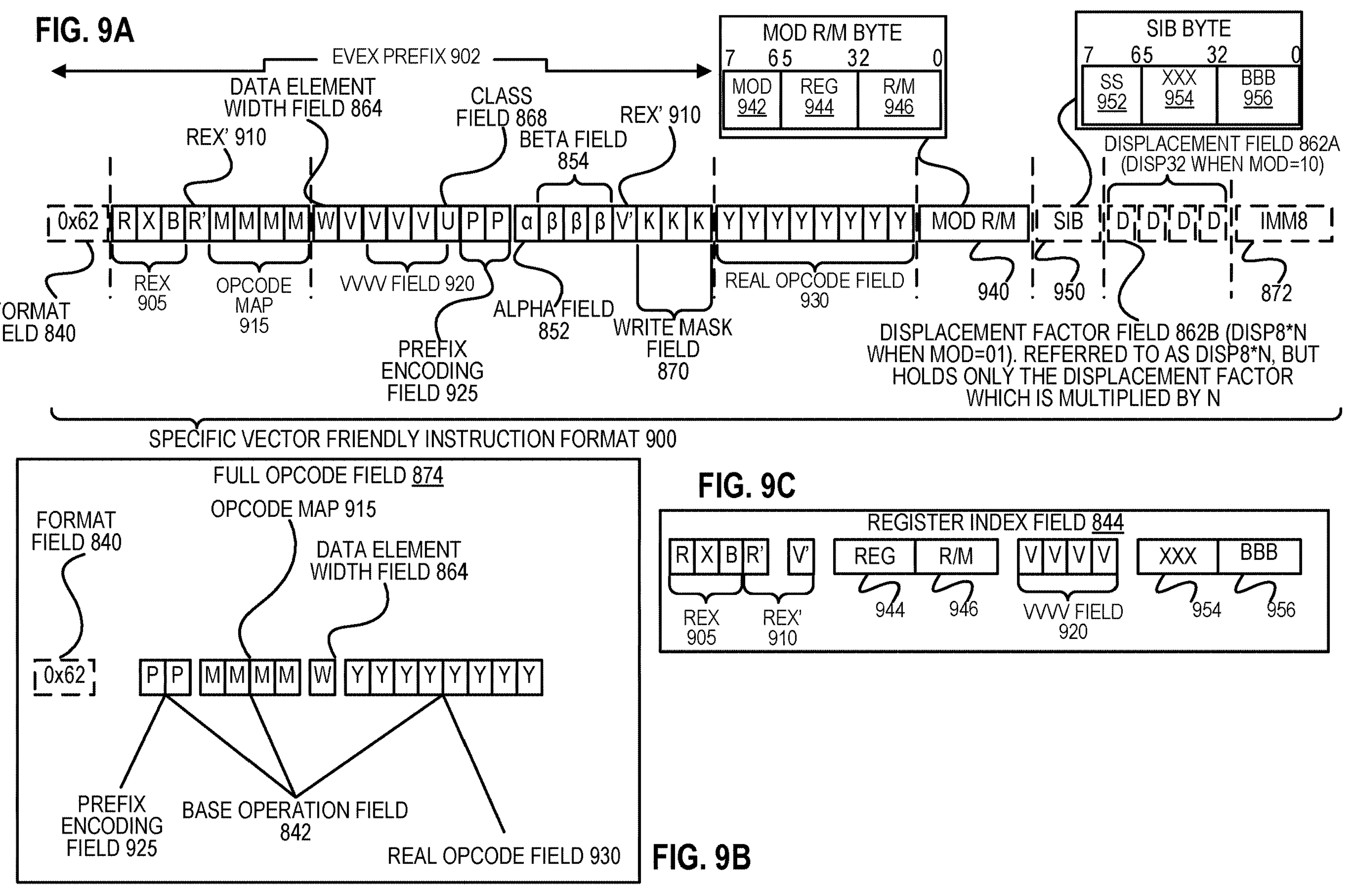
FIG. 9A
EVEX PREFIX 902
DATA ELEMENT WIDTH FIELD 864
REX' 910
CLASS FIELD 868
BETA FIELD 854
REX' 910
MOD R/M BYTE
7 6 5 3 2 0
MOD 942
REG 944
R/M 946
SIB BYTE
7 6 5 3 2 0
SS 952
XXX 954
BBB 956
DISPLACEMENT FIELD 862A (DISP32 WHEN MOD=10)
0x62
R X B R' M M M M W V V V V U P P α β β β V' K K K Y Y Y Y Y Y Y Y MOD R/M SIB D D D D IMM8
FORMAT FIELD 840
REX 905
OPCODE MAP 915
VVVV FIELD 920
PREFIX ENCODING FIELD 925
ALPHA FIELD 852
WRITE MASK FIELD 870
REAL OPCODE FIELD 930
940
950
872
DISPLACEMENT FACTOR FIELD 862B (DISP8*N WHEN MOD=01). REFERRED TO AS DISP8*N, BUT HOLDS ONLY THE DISPLACEMENT FACTOR WHICH IS MULTIPLIED BY N
SPECIFIC VECTOR FRIENDLY INSTRUCTION FORMAT 900
FULL OPCODE FIELD 874
FORMAT FIELD 840
OPCODE MAP 915
DATA ELEMENT WIDTH FIELD 864
0x62
P P M M M M W Y Y Y Y Y Y Y Y
PREFIX ENCODING FIELD 925
BASE OPERATION FIELD 842
REAL OPCODE FIELD 930
FIG. 9B
FIG. 9C
REGISTER INDEX FIELD 844
R X B R' V'
REG R/M
V V V V
XXX BBB
REX 905
REX' 910
944
946
VVVV FIELD 920
954
956

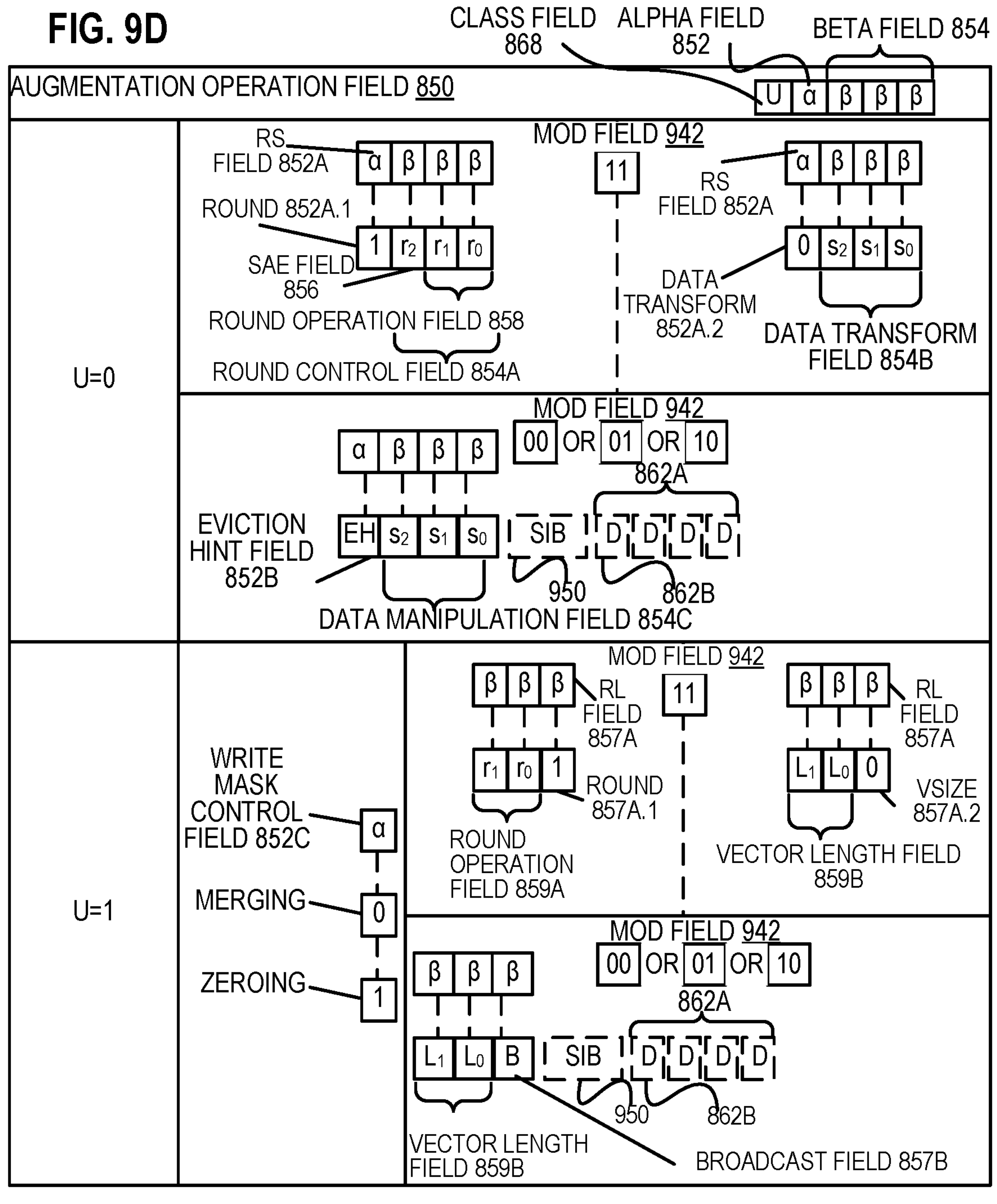
FIG. 9D
CLASS FIELD 868
ALPHA FIELD 852
BETA FIELD 854
AUGMENTATION OPERATION FIELD 850
U α β β β
U=0
RS FIELD 852A
ROUND 852A.1
SAE FIELD 856
ROUND OPERATION FIELD 858
ROUND CONTROL FIELD 854A
MOD FIELD 942
11
DATA TRANSFORM 852A.2
DATA TRANSFORM FIELD 854B
00 OR 01 OR 10
862A
EVICTION HINT FIELD 852B
EH
SIB
D D D D
950
862B
DATA MANIPULATION FIELD 854C
U=1
WRITE MASK CONTROL FIELD 852C
MERGING
ZEROING
RL FIELD 857A
ROUND 857A.1
ROUND OPERATION FIELD 859A
VSIZE 857A.2
VECTOR LENGTH FIELD 859B
BROADCAST FIELD 857B

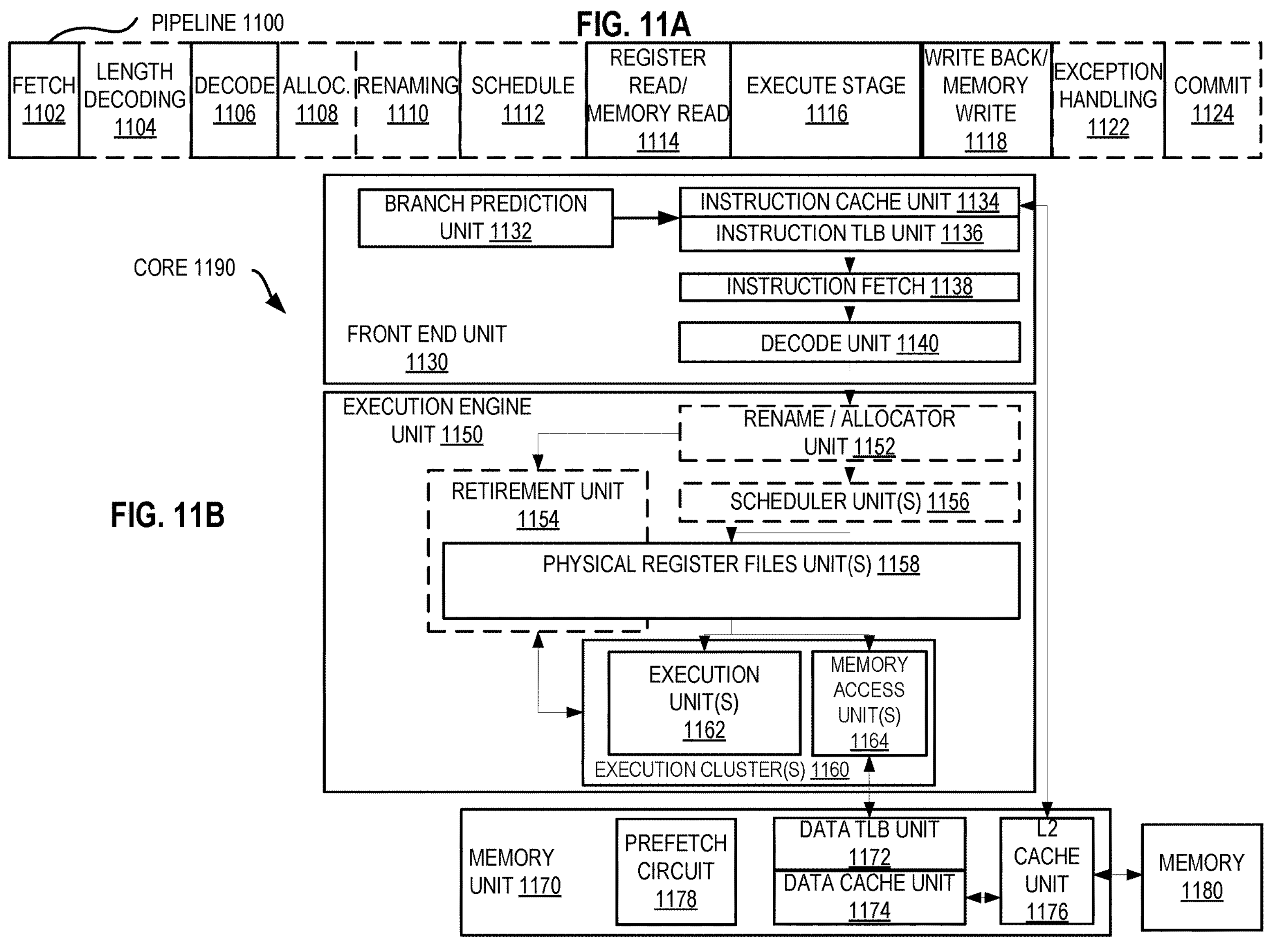
PIPELINE 1100
FIG. 11A
FETCH 1102
LENGTH DECODING 1104
DECODE 1106
ALLOC. 1108
RENAMING 1110
SCHEDULE 1112
REGISTER READ/ MEMORY READ 1114
EXECUTE STAGE 1116
WRITE BACK/ MEMORY WRITE 1118
EXCEPTION HANDLING 1122
COMMIT 1124
CORE 1190
BRANCH PREDICTION UNIT 1132
INSTRUCTION CACHE UNIT 1134
INSTRUCTION TLB UNIT 1136
INSTRUCTION FETCH 1138
FRONT END UNIT 1130
DECODE UNIT 1140
EXECUTION ENGINE UNIT 1150
RENAME / ALLOCATOR UNIT 1152
FIG. 11B
RETIREMENT UNIT 1154
SCHEDULER UNIT(S) 1156
PHYSICAL REGISTER FILES UNIT(S) 1158
EXECUTION UNIT(S) 1162
MEMORY ACCESS UNIT(S) 1164
EXECUTION CLUSTER(S) 1160
MEMORY UNIT 1170
PREFETCH CIRCUIT 1178
DATA TLB UNIT 1172
DATA CACHE UNIT 1174
L2 CACHE UNIT 1176
MEMORY 1180

CIRCUITRY AND METHODS FOR IMPLEMENTING CAPABILITIES USING NARROW REGISTERS

TECHNICAL FIELD

The disclosure relates generally to electronics, and, more specifically, an example of the disclosure relates to circuitry for implementing capabilities using narrow registers.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 7 illustrates a method of processing a store capability instruction according to examples of the disclosure.

FIG. 8A is a block diagram illustrating a generic vector friendly instruction format and class A instruction templates thereof according to examples of the disclosure.

FIG. 8B is a block diagram illustrating the generic vector friendly instruction format and class B instruction templates thereof according to examples of the disclosure.

FIG. 9A is a block diagram illustrating fields for the generic vector friendly instruction formats in FIGS. 8A and 8B according to examples of the disclosure.

FIG. 9B is a block diagram illustrating the fields of the specific vector friendly instruction format in FIG. 9A that make up a full opcode field according to one example of the disclosure.

FIG. 9C is a block diagram illustrating the fields of the specific vector friendly instruction format in FIG. 9A that make up a register index field according to one example of the disclosure.

FIG. 9D is a block diagram illustrating the fields of the specific vector friendly instruction format in FIG. 9A that make up the augmentation operation field 850 according to one example of the disclosure.

FIG. 11A is a block diagram illustrating both an exemplary in-order pipeline and an exemplary register renaming, out-of-order issue/execution pipeline according to examples of the disclosure.

FIG. 11B is a block diagram illustrating both an exemplary example of an in-order architecture core and an exemplary register renaming, out-of-order issue/execution architecture core to be included in a processor according to examples of the disclosure.

DETAILED DESCRIPTION

Figure 1:
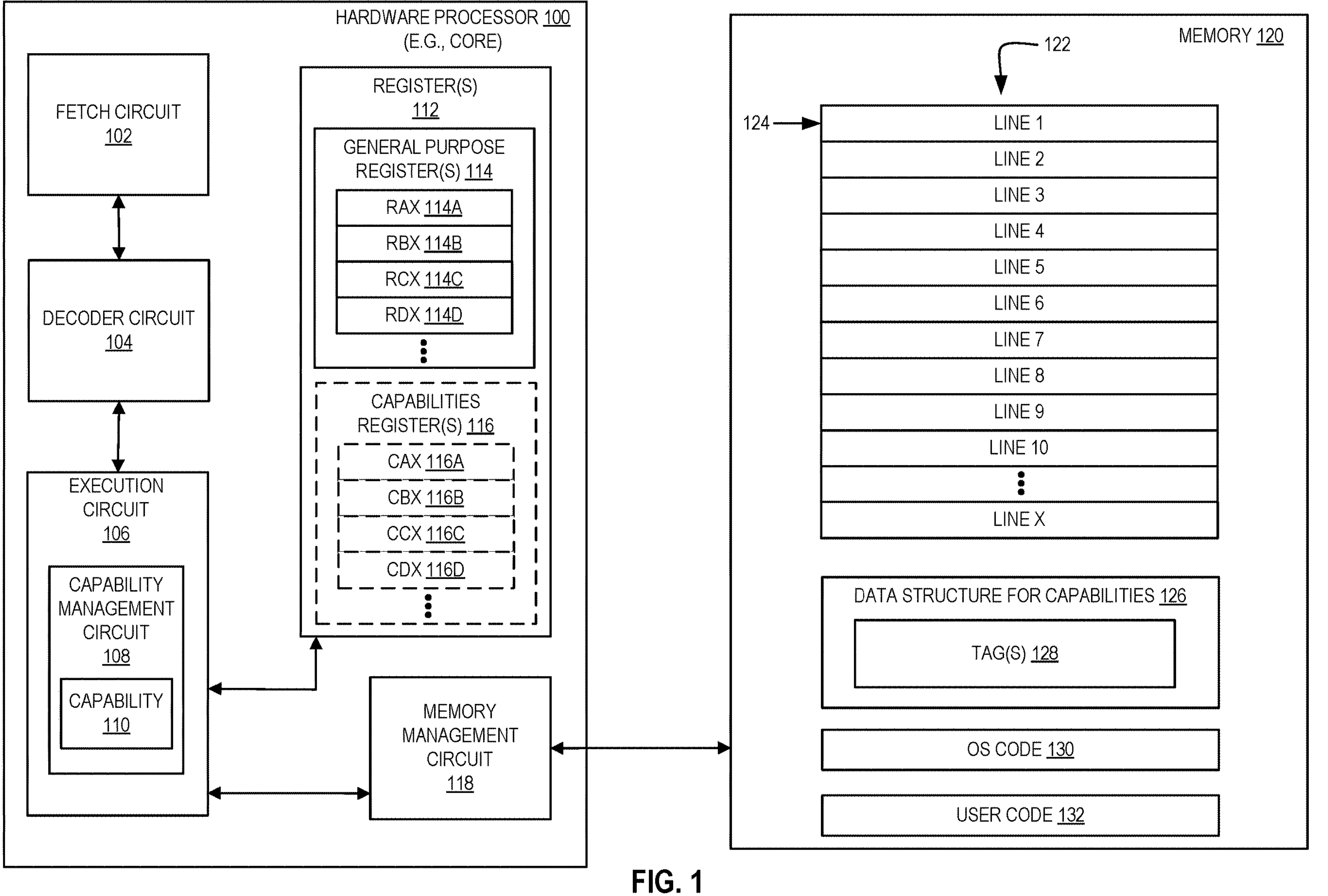
FIG. 1 illustrates a block diagram of a hardware processor including a capability management circuit and coupled to a memory according to examples of the disclosure.

In the following description, numerous specific details are set forth. However, it is understood that examples of the disclosure may be practiced without these specific details. In other instances, well-known circuits, structures, and techniques have not been shown in detail in order not to obscure the understanding of this description.

References in the specification to "one example," "an example," "certain examples," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. Certain operations include accessing one or more memory locations, e.g., to store and/or read (e.g., load) data. In certain examples, a computer includes a hardware processor requesting access to (e.g., load or store) data and the memory is local (or remote) to the computer. A system may include a plurality of cores, for example, with a proper subset of cores in each socket of a plurality of sockets, e.g., of a system-on-a-chip (SoC). Each core (e.g., each processor or each socket) may access data storage (e.g., a memory). Memory may include volatile memory (e.g., dynamic random-access memory (DRAM)) or (e.g., byte-addressable) persistent (e.g., non-volatile) memory (e.g., non-volatile RAM) (e.g., separate from any system storage, such as, but not limited, separate from a hard disk drive). One example of persistent memory is a dual in-line memory module (DIMM) (e.g., a non-volatile DIMM) (e.g., an Intel® Optane™ memory), for example, accessible according to a Peripheral Component Interconnect Express (PCIe) standard.

Memory may be divided into separate blocks (e.g., one or more cache lines), for example, with each block managed as a unit for coherence purposes. In certain examples, a (e.g., data) pointer (e.g., an address) is a value that refers to (e.g., points to) the location of data, for example, a pointer may be an (e.g., virtual) address and that data is (or is to be) stored at that address (e.g., at the corresponding physical address). In certain examples, memory is divided into multiple lines, e.g., and each line has its own (e.g., unique) address. For example, a line of memory may include storage for 512 bits, 256 bits, 128 bits, 64 bits, 32 bits, 16 bits, or 8 bits of data, or any other number of bits.

In certain examples, memory corruption (e.g., by an attacker) is caused by an out-of-bound access (e.g., memory access using the base address of a block of memory and an offset that exceeds the allocated size of the block) or by a dangling pointer (e.g., a pointer which referenced a block of memory (e.g., buffer) that has been de-allocated).

Certain examples herein utilize memory corruption detection (MCD) hardware and/or methods, for example, to prevent an out-of-bound access or an access with a dangling pointer. In certain examples, memory accesses are via a capability, e.g., instead of a pointer. In certain examples, the capability is a communicable (e.g., unforgeable) token of authority, e.g., through which programs access all memory and services within an address space. In certain examples, capabilities are a fundamental hardware type that are held in registers (e.g., where they can be inspected, manipulated, and dereferenced using capability instructions) or in memory (e.g., where their integrity is protected). In certain examples, the capability is a value that references an object along with an associated set of one or more access rights. In certain examples, a (e.g., user level) program on a capability-based operating system (OS) is to use a capability (e.g., provided to the program by the OS) to access a capability protected object.

In certain examples of a capability-based addressing scheme, (e.g., code and/or data) pointers are replaced by protected objects (e.g., "capabilities") that are created only through the use of privileged instructions, for example, which are executed only by either the kernel of the OS or some other privileged process authorized to do so, e.g., effectively allowing the kernel (e.g., supervisor level) to control which processes may access which objects in memory (e.g., without the need to use separate address spaces and therefore requiring a context switch for an access). Certain examples implement a capability-based addressing scheme by extending the data storage (for example, extending memory (e.g., and register) addressing) with an additional bit (e.g., writable only if permitted by the capability management circuit) that indicates that a particular location is a capability, for example, such that all memory accesses (e.g., loads, stores, and/or instruction fetches) must be authorized by a respective capability or be denied. Example formats of capabilities are discussed below in reference to FIGS. 2A and 2B.

Turning now to the Figures, FIG. 1 illustrates a block diagram of a hardware processor 100 (e.g., core) including a capability management circuit 108 and coupled to a memory 120 according to examples of the disclosure. Although the capability management circuit 108 is depicted within the execution circuit 106, it should be understood that the capability management circuit can be located elsewhere, for example, in another component of hardware processor 100 (e.g., within fetch circuit 102) or separate from the depicted components of hardware processor 100.

Depicted hardware processor 100 includes a hardware fetch circuit 102 to fetch an instruction (e.g., from memory 120), e.g., an instruction that is to request access to a block (or blocks) of memory storing a capability (e.g., or a pointer) and/or an instruction that is to request access to a block (or blocks) of memory 120 through a capability 110 (e.g., or a pointer) to the block (or blocks) of the memory 120. Depicted hardware processor 100 includes a hardware decoder circuit 104 to decode an instruction, e.g., an instruction that is to request access to a block (or blocks) of memory storing a capability (e.g., or a pointer) and/or an instruction that is to request access to a block (or blocks) of memory 120 through a capability 110 (e.g., or a pointer) to the block (or blocks) of the memory 120. Depicted hardware execution circuit 106 is to execute the decoded instruction, e.g., an instruction that is to request access to a block (or blocks) of memory storing a capability (e.g., or a pointer) and/or an instruction that is to request access to a block (or blocks) of memory 120 through a capability 110 (e.g., or a pointer) to the block (or blocks) of the memory 120.

In certain examples, capability management circuit 108 is to, in response to receiving an instruction that is requested for fetch, decode, and/or execution, check if the instruction is a capability instruction or a non-capability instruction (e.g., a capability-unaware instruction), for example, and (i) if a capability instruction, is to allow access to memory 120 storing (1) a capability and/or (2) data and/or instructions (e.g., an object) protected by a capability, and/or (ii) if a non-capability instruction, is not to allow access to memory 120 storing (1) a capability and/or (2) data and/or instructions (e.g., an object) protected by a capability. In certain examples, capability management circuit 108 is to check if an instruction is a capability instruction or a non-capability instruction by checking (i) a field (e.g., opcode) of the instruction (e.g., checking a corresponding bit or bits of the field that indicate if that instruction is a capability instruction or a non-capability instruction) and/or (ii) if a particular register is a "capability" type of register (e.g., instead of a general-purpose data register) (e.g., implying that certain register(s) are not to be used to store a capability or capabilities). In certain examples, capability management circuit 108 is to manage the capabilities, e.g., only the capability management circuit is to set and/or clear validity tags. In certain examples, capability management circuit 108 is to clear the validity tag of a capability in a register in response to that register being written to by a non-capability instruction.

In certain examples, the source storage location (e.g., virtual address) for a capability 110 in memory 120 is an operand of an (e.g., supervisor level or user level) instruction (e.g., having a mnemonic of LoadCap) that is to load the capability from the memory 120 into register(s) 112. In certain examples, the destination storage location (e.g., virtual address) for capability 110 in memory 120 is an operand of an (e.g., supervisor level) instruction (e.g., having a mnemonic of StoreCap) that is to store the capability from the register(s) 112 into memory 120. In certain examples, the instruction is requested for execution by executing OS code 130 (e.g., or some other privileged process authorized to do so) and/or by executing user code 132.

In certain examples, capability management circuit 108 is to enforce security properties on changes to capability data (e.g., metadata), for example, for the execution of a single instruction, by enforcing: (i) provenance validity that ensures that valid capabilities can only be constructed by instructions that do so explicitly (e.g., not by byte manipulation) from other valid capabilities (e.g., with this property applying to capabilities in registers and in memory), (ii) capability monotonicity that ensures, when any instruction constructs a new capability (e.g., except in sealed capability manipulation and exception raising), it cannot exceed the permissions and bounds of the capability from which it was derived, and/or (iii) reachable capability monotonicity that ensures, in any execution of arbitrary code, until execution is yielded to another domain, the set of reachable capabilities (e.g., those accessible to the current program state via registers, memory, sealing, unsealing, and/or constructing sub-capabilities) cannot increase.

In certain examples, capability management circuit 108 (e.g., at boot time) provides initial capabilities to the firmware, allowing data access and instruction fetch across the full address space. Additionally, all tags are cleared in memory in certain examples. Further capabilities can then be derived (e.g., in accordance with the monotonicity property) as they are passed from firmware to boot loader, from boot loader to hypervisor, from hypervisor to the OS, and from the OS to the application. At each stage in the derivation chain, bounds and permissions may be restricted to further limit access. For example, the OS may assign capabilities for only a limited portion of the address space to the user software, preventing use of other portions of the address space. In certain examples, capabilities carry with them intentionality, e.g., when a process passes a capability as an argument to a system call, the OS kernel can use only that capability to ensure that it does not access other process memory that was not intended by the user process (e.g., even though the kernel may in fact have permission to access the entire address space through other capabilities it holds). In certain examples, this prevents "confused deputy" problems, e.g., in which a more privileged party uses an excess of privilege when acting on behalf of a less privileged party, performing operations that were not intended to be authorized. In certain examples, this prevents the kernel from overflowing the bounds on a user space buffer when a pointer to the buffer is passed as a system-call argument. In certain examples, these architectural properties of a capability management circuit 108 provide the foundation on which a capability-based OS, compiler, and runtime can implement a certain programming language (e.g., C and/or C++) with memory safety and compartmentalization.

In certain examples, the capability is stored in a single line of data. In certain examples, the capability is stored in multiple lines of data. For example, a block of memory may be lines 1 and 2 of data of the (e.g., physical) addressable memory 122 of memory 120 having an address 124 to one (e.g., the first) line (e.g., line 1). Certain examples have a memory of a total size X, where X is any positive integer.

In certain examples, capabilities (e.g., one or more fields thereof) themselves are also stored in memory 120, for example, in data structure 126 (e.g., table) for capabilities. In certain examples, a (e.g., validity) tag 128 is stored in data structure 126 for a capability stored in memory. In certain examples, tags 128 (e.g., in data structure 126) are not accessible by non-capability (e.g., load and/or store) instructions. In certain examples, a (e.g., validity) tag is stored along with the capability stored in memory (e.g., in one contiguous block).

Depicted hardware processor 100 includes one or more registers 112, for example, general purpose (e.g., data) register(s) 114 (e.g., registers RAX 114A, RBX 114B, RCX 114C, RDX 114D, etc.) and/or (optional) (e.g., dedicated only for capabilities) capabilities register(s) 116 (e.g., registers CAX 116A, CBX 116B, CCX 116C, CDX 116D, etc.).

Hardware processor 100 includes a coupling (e.g., connection) to memory 120. In certain examples, memory 120 is a memory local to the hardware processor (e.g., system memory). In certain examples, memory 120 is a memory separate from the hardware processor, for example, memory of a server. Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain examples herein.

Hardware processor 100 includes a memory management circuit 118, for example, to control access (e.g., by the execution unit 106) to the (e.g., addressable memory 122 of) memory 120.

In certain examples, an indication (e.g., name) of the destination register for capability 110 in register(s) 112 is an operand of an (e.g., supervisor level) instruction (e.g., having a mnemonic of LoadCap) that is to load the capability from the memory 120 into register(s) 112. In certain examples, an indication (e.g., name) of the source register for capability 110 in register(s) 112 is an operand of an (e.g., supervisor level) instruction (e.g., having a mnemonic of StoreCap) that is to store the capability from the register(s) 112 into memory 120.

In certain examples, capability management circuit 108 uses capability-based access control for enforcing memory safety, e.g., and low-overhead compartmentalization. However, in certain examples, capabilities require a larger data width than a pointer, for example, using (e.g., at least 128-bit or at least 129-bit) registers that are wider than (e.g., 64-bit) the registers used to store pointers to allow for storage of a capability (e.g., a pointer along with its bounds, permissions, and/or other metadata). This introduces significant overhead within the design for expanded register files. Examples herein allow for (e.g., 128-bit or 129-bit) capabilities to span a plurality of (e.g., 64-bit) registers without expanding the register file, for example, without expanding the (e.g., logical) width of general-purpose registers to the capability width (e.g., 128-bits or 129-bits) and/or without defining an additional, separate register file to hold the width of the capability (e.g., 128-bit or 129-bit), e.g., because expanding registers and/or introducing new registers increases processor (e.g., silicon) area overhead and timing latency.

Examples herein split a (for example, 128-bit or 129-bit or it could even be larger, e.g., 256 bits, 257 bits, etc.) capability between a plurality of (e.g., 64-bit) general-purpose registers to avoid the need to expand registers or to define new registers. In certain examples, a capability is stored in a multiple-register, split capability register file that includes a general-purpose capability register file (e.g., capabilities register(s) 116) and a general-purpose integer register file (e.g., general purpose register(s) 114). In certain examples, a capability is stored in a single (e.g., merged) capability register file that extends the width of a general-purpose integer register to include additional capability data (e.g., tag, etc.).

Examples herein are directed to a LoadCap instruction having an opcode to indicate that an execution circuit is to load a first proper subset of a capability from a memory address into a single destination register identified by an operand of the instruction and load a second proper subset of the capability from the memory address into an implicit (e.g., not identified by an operand of the instruction) second (e.g., and third, etc.) destination register. Examples herein are directed to a StoreCap instruction having an opcode to indicate that an execution circuit is to store a first proper subset of a capability from a single source register identified by an operand of the instruction to a memory address and a second proper subset of the capability from an implicit (e.g., not identified by an operand of the instruction) second source register to the memory address. Alternatively, LoadCap and StoreCap instructions may explicitly specify multiple registers, each containing a portion of a capability. These examples are improvements to the functioning of a processor (e.g., of a computer) itself because they allow the loading and storing of a capability, respectively, to and from multiple physical registers via a single register operand instruction, e.g., and thus, without causing a need for an expanded register file or separate capability width registers. The instructions disclosed herein are improvements to the functioning of a processor (e.g., of a computer) itself because they implement the above functionality by electrically changing a general-purpose computer (e.g., the decoder circuit and/or the execution circuit thereof) by creating electrical paths within the computer (e.g., within the decoder circuit and/or the execution circuit thereof). These electrical paths create a special purpose machine for carrying out the particular functionality.

The instructions disclosed herein are improvements to the functioning of a processor (e.g., of a computer) itself. Instruction decode circuitry (e.g., decoder circuit 104) not having such an instruction as a part of its instruction set would not decode as discussed herein. An execution circuit (e.g., execution circuit 106) not having such an instruction as a part of its instruction set would not execute as discussed herein. For example, a LoadCap instruction having an opcode to indicate that an execution circuit is to load a first proper subset of a capability from a memory address into a single destination register identified by an operand of the instruction and load a second proper subset of the capability from the memory address into an implicit (e.g., not identified by an operand of the instruction) second (e.g., and third, etc.) destination register and/or a StoreCap instruction having an opcode to indicate that an execution circuit is to store a first proper subset of a capability from a single source register identified by an operand of the instruction to a memory address and a second proper subset of the capability from an implicit (e.g., not identified by an operand of the instruction) second source register to the memory address. Alternatively, LoadCap and StoreCap instructions may explicitly specify multiple registers, each containing a portion of a capability. Examples herein are improvements to the functioning of a processor (e.g., of a computer) itself as they provide enhanced security (e.g., security hardening). Examples herein are improvements to the functioning of a processor (e.g., of a computer) itself as they allow more efficient repurposing of registers (e.g., also used for pointers) that are narrower than a capability.

A capability may have different formats and/or fields. In certain examples, a capability is more than twice the width of a native (e.g., integer) pointer type of the baseline architecture, for example, 129-bit capabilities on 64-bit platforms, and 65-bit capabilities on 32-bit platforms. In certain examples, each capability includes an (e.g., integer) address of the natural size for the architecture (e.g., 32 or 64 bit) and also additional metadata (e.g., that is compressed in order to fit) in the remaining (e.g., 32 or 64) bits of the capability. In certain examples, each capability includes (or is associated with) a (e.g., 1-bit) validity "tag" whose value is maintained in registers and memory by the architecture (e.g., by capability management circuit 108). In certain examples, each element of the capability contributes to the protection model and is enforced by hardware (e.g., capability management circuit 108).

In certain examples, when stored in memory, valid capabilities are to be naturally aligned (e.g., at 64-bit or 128-bit boundaries) depending on capability size where that is the granularity at which in-memory tags are maintained. In certain examples, partial or complete overwrites with data, rather than a complete overwrite with a valid capability, lead to the in-memory tag being cleared, preventing corrupted capabilities from later being dereferenced. In certain examples, capability compression reduces the memory footprint of capabilities, e.g., such that the full capability, including address, permissions, and bounds fits within a certain width (e.g., 128 bits plus a 1-bit out-of-band tag). In certain examples, capability compression takes advantage of redundancy between the address and the bounds, which occurs where a pointer typically falls within (or close to) its associated allocation. In certain examples, the compression scheme uses a floating-point representation, allowing high-precision bounds for small objects, but uses stronger alignment and padding for larger allocations.

Figures 2A, 2B:
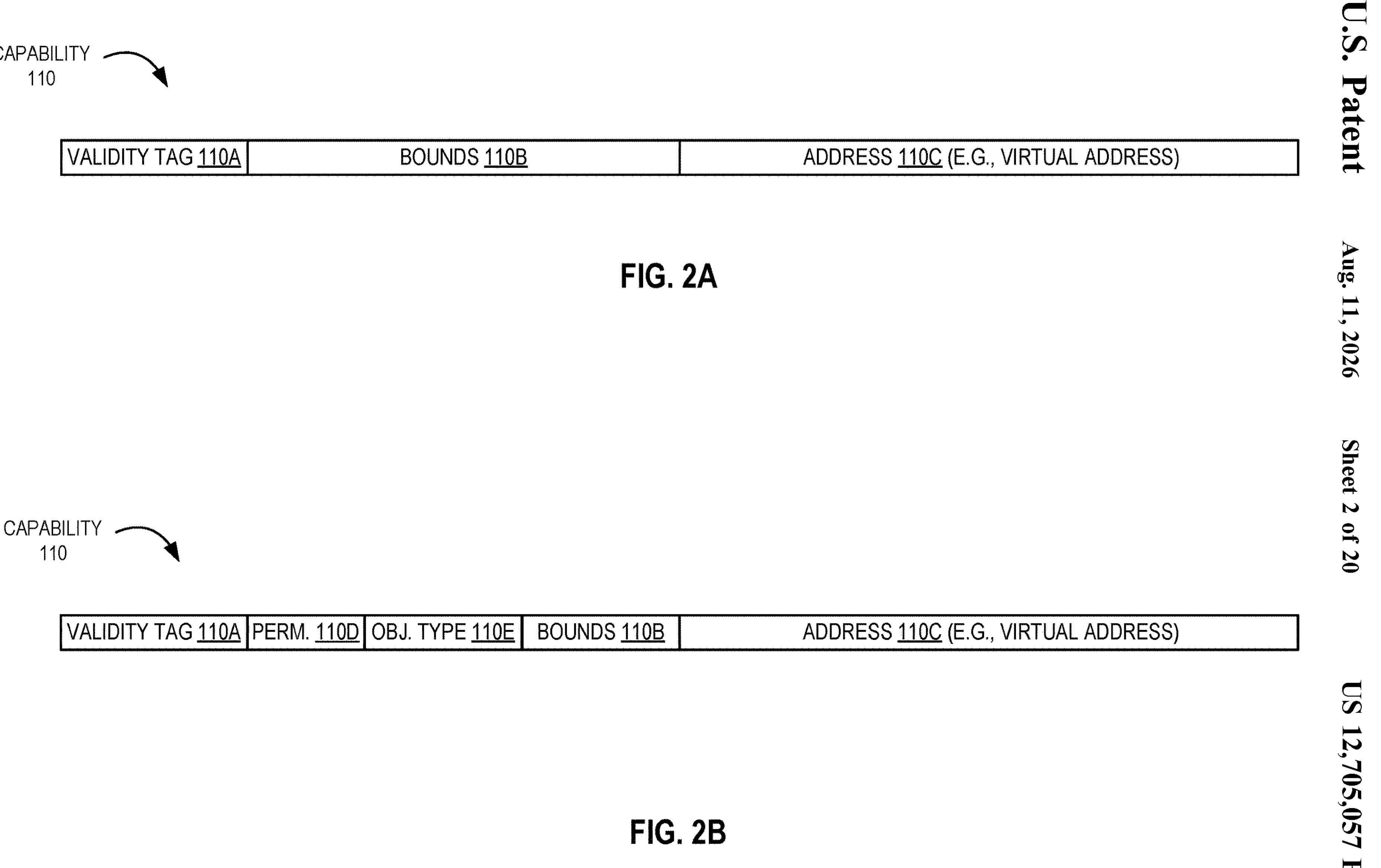
FIG. 2A illustrates an example format of a capability including a validity tag field, a bounds field, and an address field according to examples of the disclosure.
FIG. 2B illustrates an example format of a capability including a validity tag field, a permission field, an object type field, a bounds field, and an address field according to examples of the disclosure.

FIG. 2A illustrates an example format of a capability 110 including a validity tag 110A field, a bounds 110B field, and an address 110C (e.g., virtual address) field according to examples of the disclosure.

In certain examples, the format of a capability 110 includes one or any combination of the following. A validity tag 110A where the tag tracks the validity of a capability, e.g., if invalid, the capability cannot be used for load, store, instruction fetch, or other operations. In certain examples, it is still possible to extract fields from an invalid capability, including its address. In certain examples, capability-aware instructions maintain the tag (e.g., if desired) as capabilities are loaded and stored, and as capability fields are accessed, manipulated, and used. A bounds 110B that identifies the lower bound and/or upper bound of the portion of the address space to which the capability authorizes access (e.g., loads, stores, instruction fetches, or other operations). An address 110C (e.g., virtual address) for the address of the capability protected data (e.g., object).

In certain examples, the validity tag 110A provides integrity protection, the bounds 110B limits how the value can be used (e.g., for memory access), and/or the address 110C is the memory address storing the corresponding data (or instructions) protected by the capability.

FIG. 2B illustrates an example format of a capability 110 including a validity tag 110A field, a permission(s) 110D field, an object type 110E field, a bounds 110B field, and an address 110C field according to examples of the disclosure.

In certain examples, the format of a capability 110 includes one or any combination of the following. A validity tag 110A where the tag tracks the validity of a capability, e.g., if invalid, the capability cannot be used for load, store, instruction fetch, or other operations. In certain examples, it is still possible to extract fields from an invalid capability, including its address. In certain examples, capability-aware instructions maintain the tag (e.g., if desired) as capabilities are loaded and stored, and as capability fields are accessed, manipulated, and used. A bounds 110B that identifies the lower bound and/or upper bound of the portion of the address space to which the capability authorizes access (e.g., loads, stores, instruction fetches, or other operations). An address 110C (e.g., virtual address) for the address of the capability protected data (e.g., object). Permissions 110D include a value (e.g., mask) that controls how the capability can be used, e.g., by restricting loading and storing of data and/or capabilities or by prohibiting instruction fetch. An object type 110E that identifies the object, for example (e.g., in a (e.g., C++) programming language that supports a "struct" as a composite data type (or record) declaration that defines a physically grouped list of variables under one name in a block of memory, allowing the different variables to be accessed via a single pointer or by the struct declared name which returns the same address), a first object type may be used for a struct of people's names and a second object type may be used for a struct of their physical mailing addresses (e.g., as used in an employee directory). In certain examples, if the object type 110E is not equal to a certain value (e.g., −1), the capability is "sealed" (with this object type) and cannot be modified or dereferenced. Sealed capabilities can be used to implement opaque pointer types, e.g., such that controlled non-monotonicity can be used to support fine-grained, in-address-space compartmentalization.

In certain examples, permissions 110D include one or more of the following: "Load" to allow a load from memory protected by the capability, "Store" to allow a store to memory protected by the capability, "Execute" to allow execution of instructions protected by the capability, "LoadCap" to load a valid capability from memory into a register, "StoreCap" to store a valid capability from a register into memory, "Seal" to seal an unsealed capability, "Unseal" to unseal a sealed capability, "System" to access system registers and instructions, "BranchSealedPair" to use in an unsealing branch, "CompartmentID" to use as a compartment ID, "MutableLoad" to load a (e.g., capability) register with mutable permissions, and/or "User[N]" for software defined permissions (where N is any positive integer greater than zero).

In certain examples, the validity tag 110A provides integrity protection, the permission(s) 110D limits the operations that can be performed on the corresponding data (or instructions) protected by the capability, the bounds 110B limits how the value can be used (e.g., for example, for memory access), the object type 110E supports higher-level software encapsulation, and/or the address 110C is the memory address storing the corresponding data (or instructions) protected by the capability.

In certain examples, a capability (e.g., value) includes one or any combination of the following fields: address value (e.g., 64 bits), bounds (e.g., 87 bits), flags (e.g., 8 bits), object type (e.g., 15 bits), permissions (e.g., 16 bits), tag (e.g., 1 bit), global (e.g., 1 bit), and/or executive (e.g., 1 bit). In certain examples, the flags and the lower 56 bits of the "capability bounds" share encoding with the "capability value".

In certain examples, the format of a capability (for example, as a pointer that has been extended with security metadata, e.g., bounds, permissions, and/or type information) overflows the available bits in a pointer (e.g., 64-bit) format. In certain examples, to support storing capabilities in a general-purpose register file without expanding the registers, examples herein logically combine multiple registers (e.g., four for a 256-bit capability) so that the capability can be split across those multiple underlying registers, e.g., such that general purpose registers of a narrower size can be utilized with the wider format of a capability as compared to a (e.g., narrower sized) pointer.

Figures 3A, 3B:
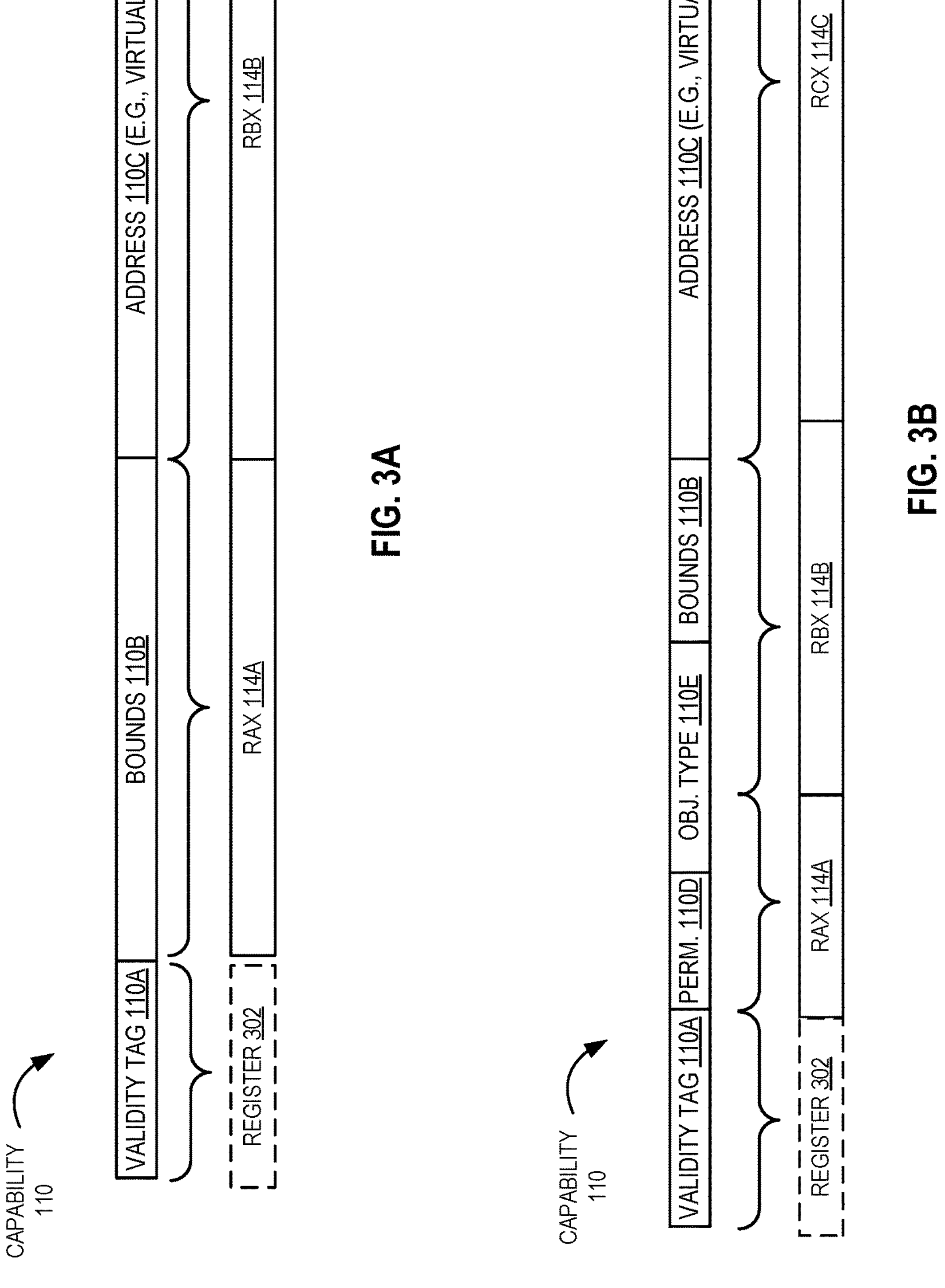
FIG. 3A illustrates a split of the example format of the capability in FIG. 2A into two registers according to examples of the disclosure.
FIG. 3B illustrates a split of the example format of the capability in FIG. 2A into three registers according to examples of the disclosure.

FIG. 3A illustrates a split of the example format 110 of the capability in FIG. 2A into two registers 114A and 114B according to examples of the disclosure. The ratio of the split (e.g., as set in the architecture) of the capability into the registers is merely an example, and it should be understood that other split(s) of the capability may be utilized (e.g., a split on a field-by-field granularity or an intra field granularity such that part of a same field is split between multiple registers). In certain examples, a first proper subset of the capability 110 (e.g., the bounds 110B and/or address 110C (or a proper subset of any field thereof)) is stored in a first register (e.g., RAX 114A) and a second proper subset of the capability 110 (e.g., the rest of the bounds 110B and/or address 110C (or a proper subset of any field thereof)) is stored in a second register (e.g., RBX 114B). As one example, the bounds 110B are stored in the first register (e.g., RAX 114A) and the address 110C is stored in the second register (e.g., RBX 114B). In certain examples, the validity tag 110A is not stored within a named architectural register (e.g., RAX and RBX in FIG. 3A) because the validity tag distinguishes a protected capability from an ordinary data value, and if the validity tag is within the register itself, then a non-capability (e.g., ordinary data) instruction could forge a capability. In certain examples, validity tag 110A is stored in a (e.g., hidden) register 302 that non-capability (e.g., ordinary data) instructions cannot access. In certain examples, the second register is the logically next register, e.g., if the first register is RAX, the next logical register is RBX; if the first register is RBX, the next logical register is RCX, if the first register is R8, the next logical register is R9, etc. Some examples allow capabilities to be split across registers that are not logically adjacent, e.g., RAX and RSI, RBX and R8, etc. In certain examples, a LoadCap instruction specifies all registers explicitly, and it may then record in metadata associated with the registers that they are associated with each other (e.g., for a single capability), e.g., to allow referencing the entire capability even if just a single register is specified in an instruction operand, and/or to mitigate security risks arising from misuse of combinations of registers that are not all part of the same capability. Certain examples specify what portion of a capability is contained in each of the registers to prevent them being reordered, e.g., and hence misinterpreted, which could lead to incorrect policy enforcement. Subsequent instructions that make use of the loaded capability may specify one or more (e.g., less than all) of the registers containing the loaded capability, and the processor may load the full capability from the complete set of registers containing all portions of the capability. Certain examples require that a capability operand reference a register containing a particular portion of a capability, e.g., its least-significant bits. Certain examples that allow instructions using capabilities to specify all registers containing the capabilities may generate an exception if not all of the registers for a given capability are specified as part of the instruction. A StoreCap instruction may be one example of a capability instruction that explicitly specifies multiple registers, each containing a portion of a capability in a specified order. Some implementations encrypt capabilities rather than protecting them against forgery using a validity bit. Such implementations may still distribute (e.g., "split") a capability across multiple registers.

FIG. 3B illustrates a split of the example format 110 of the capability in FIG. 2A into three registers 114A, 114B, and 114C according to examples of the disclosure. The ratio of the split of the capability into the registers is merely an example, and it should be understood that other split(s) of the capability may be utilized. The ratio of the split (e.g., as set in the architecture) of the capability into the registers is merely an example, and it should be understood that other split(s) of the capability may be utilized (e.g., a split on a field-by-field granularity or an intra field granularity such that part of a same field is split between multiple registers). In certain examples, a first proper subset of the capability 110 (e.g., the permission(s) 110D, object type 110E, bounds 110B, and/or address 110C (or a proper subset of any field thereof)) is stored in a first register (e.g., RAX 114A), a second proper subset of the capability 110 (e.g., the permission(s) 110D, object type 110E, bounds 110B, and/or address 110C (or a proper subset of any field thereof)) is stored in a second register (e.g., RBX 114B), and a third proper subset of the capability 110 (e.g., the permission(s) 110D, object type 110E, bounds 110B, and/or address 110C (or a proper subset of any field thereof)) is stored in a third register (e.g., RCX 114C). As one example, the permission (s) 110D and part of the object type 110E are stored in the first register (e.g., RAX 114A), the remainder of the object type 110E and the bounds 110B are stored in the second register (e.g., RBX 114B), and the address 110C is stored in the third register (e.g., RCX 114C). In certain examples, the validity tag 110A is not stored within a named architectural register (e.g., RAX, RBX, and RCX in FIG. 3B) because the validity tag distinguishes a protected capability from an ordinary data value, and if the validity tag is within the register itself, then a non-capability (e.g., ordinary data) instruction could forge a capability. In certain examples, validity tag 110A is stored in a (e.g., hidden) register 302 that non-capability (e.g., ordinary data) instructions cannot access. In certain examples, the second register is the logically next register and the third is its logically next register, e.g., if the first register is RAX, the next logical register is RBX, and its logically next register is RCX; if the first register is RBX, the next logical register is RCX, and its logically next register is RDX, etc. Other examples may permit capability instructions to explicitly specify multiple registers containing different portions of a capability, or they may encode linkages between registers in metadata associated with those registers.

In certain examples, a challenge arises in referencing a split capability where memory operands in an instruction set architecture (ISA) can only encode a single general-purpose register (GPR) as a base address register. As a solution to this limitation, certain examples herein define a fixed set of pairings for registers. For example, RAX:RBX, RCX:RDX, RSI:RDI, R14:R15 for an (e.g., x86) ISA may be defined as valid pairings. When the first register in a recognized pairing (e.g., RAX in an RAX:RBX pairing) is referenced in a memory operand, the processor in certain examples automatically loads the second portion of the capability from the paired register (e.g., RBX). In certain examples, this also serves to implicitly identify capability-based memory references, e.g., if a memory operand references a register that is not the first register in a recognized pairing, then it may be treated as an ordinary (e.g., 64-bit) pointer and not a capability. In certain examples, an indication that differentiates a capability from a pointer is included in an instruction encoding, e.g., a field of the instruction that denotes capability-based memory accesses. In certain examples, the field is a bit in an instruction (e.g., REX) prefix (e.g., as discussed below), for example, that when set to a first value (e.g., 1) indicates the instruction has a capability as an operand and when set to a second value (e.g., 0) indicates the instruction does not have a capability as an operand (e.g., instead having a pointer as an operand).

In certain examples, a register file (e.g., general purpose registers 114) is extended to store "valid" bits for capabilities to distinguish them from ordinary pointers and other data values that can be stored in registers. For example, if eight register pairings are recognized for sixteen registers, then eight corresponding validity bits are also be stored in the register file. In certain examples, a plurality of validity bits are stored in a single register. For example, a single register having a first field (e.g., bit) for a first validity tag for a first set of registers storing a first single capability, a second field (e.g., bit) for a second validity tag for a second set of registers storing a second single capability, etc.

Although the above discusses splitting a capability between multiple general-purpose registers (e.g., general purpose registers 114), it should be understood that a capability may be split between multiple capability registers (e.g., capability registers 116) and/or split between a general-purpose register(s) (e.g., general purpose register(s) 114) and a capability register(s) (e.g., capability register(s) 116), for example, with a single register operand causing the entire split capability to be stored or loaded into the multiple underlying registers.

In certain examples, a capability ISA uses the valid bit to prevent capability forgery. For example, if a non-capability (e.g., ordinary arithmetic) instruction is applied to modify or potentially modify any register containing a portion of a first capability to form a second capability, then the valid bit would be cleared by hardware (e.g., capability management circuit 108) for that register pairing for that first capability (or set of three or more registers containing a single capability). In certain examples, even if it is a capability instruction applied to modify or potentially modify any register containing a portion of a capability, and that instruction does not modify the entire first capability to form the second capability, then the valid bit for the first capability would be cleared by hardware even if the valid bit becomes set by hardware for the second capability. In some cases, the valid bit storage for the first capability may be reused as the valid bit storage for the second capability, in which case that valid bit storage would remain set, but potential other metadata pertaining to the first capability may be updated to prevent unauthorized modification of the first capability. For example, if the least-significant bits of the first capability are overwritten in a first register, but other registers are used to contain the most-significant bits of the second capability than were used to contain the most-significant bits of the first capability, then the metadata specifying register linkages would be updated by hardware to indicate that the new set of registers used to contain the most-significant bits of the second capability are associated with the first register containing the least-significant bits of the second capability.

In certain examples, there are atomic or non-atomic instructions for loading and storing the multiple parts of the capability (e.g., including the valid bit). Certain examples herein are directed to instructions to load and store capabilities (e.g., a capability that is generated by an operating system) between a set of split registers and a memory. In certain examples, a LoadCap instruction is atomic, e.g., locking the memory from other access until the corresponding two or more loads of the capability from the memory into the two or more corresponding registers are completed. In certain examples, a StoreCap instruction is atomic, e.g., locking the memory from other access until the corresponding two or more stores of the capability from the two or more corresponding registers into the memory are completed. In certain examples, an atomic LoadCap instruction is used because non-atomic capability loads could introduce unacceptable security risks, for example, if bounds information is split across multiple (e.g., 64-bit) registers, then combining partial bounds information from unrelated capabilities could result in invalid bounds that permit unauthorized accesses.

In certain examples, the corresponding plurality of loads (e.g., dispatched by memory management circuit 118 in FIG. 1) caused by execution of a LoadCap instruction are sent as two separate memory read requests (e.g., "double pumped"), for example, to avoid requiring a full width (or a full width less the validity tag) (e.g., 128-bit or 129-bit) (e.g., 256-bit or 257-bit) capability access path. In certain examples, the corresponding plurality of stores (e.g., dispatched by memory management circuit 118 in FIG. 1) caused by execution of a StoreCap instruction are sent as two separate memory write requests (e.g., "double pumped"), for example, to avoid requiring a full width (or a full width less the validity tag) (e.g., 128-bit or 129-bit) capability access path.

In certain examples, the (e.g., physical) splitting of a single capability into multiple (e.g., entire) registers allows for combining of some capabilities. In certain examples, multiple capabilities into a same object have a same set of capability values other than the address field (e.g., as shown in FIGS. 2A-3B), for example, the same permission(s) 110D, object type 110E, and/or bounds 110B. As an example, a first capability and a second capability according to the format in FIG. 3A may have a same value in bounds 110B, thus instead of consuming four registers for those fields of the two capabilities, in certain examples, a single register (e.g., RAX 114A) stores a single instance of the "shared" bounds 110B, and a second register (e.g., RBX 114B) stores the address in memory of the data (or instruction(s)) for that first capability and a third register (e.g., RCX 114C) stores the address in memory of the data (or instruction(s)) for that second capability. In certain examples, a tag 110A for each capability is stored separately, e.g., in a first instance and a second instance of register 302 (e.g., within registers 112 in processor 100 in FIG. 1, within registers 412 in processor 400 in FIG. 4, or within registers 612 in FIG. 6) for the first capability and the second capability, respectively. As an example, a first capability and a second capability according to the format in FIG. 3B may have a same value in permission(s) 110D, object type 110E, and bounds 110B, thus instead of consuming six registers for those fields of the two capabilities, in certain examples, a single register (e.g., RAX 114A) stores a single instance of the "shared" permission(s) 110D, a second register (e.g., RBX 114B) stores a single instance of the "shared" object type 110E and "shared" bounds 110B, a third register (e.g., RCX 114C) stores the address in memory of the data (or instruction(s)) for that first capability, and a fourth register (e.g., RDX 114D) stores the address in memory of the data (or instruction(s)) for that second capability. In certain examples, a tag 110A for each capability is stored separately, e.g., in a first instance and a second instance of register 302 (e.g., within registers 112 in processor 100 in FIG. 1, within registers 412 in processor 400 in FIG. 4, or within registers 612 in FIG. 6) for the first capability and the second capability, respectively.

An example implementation is that a field of a capability instruction (e.g., the opcode) specifies the unique part of the capability, which would then be mapped to the shared part. Another example implementation is to add a bit (e.g., as metadata or concatenated with the address field) to (or corresponding to) the unique part of the capability (e.g., address 110C) that, when set, indicates the address corresponds to a shared non-unique part of the capability (e.g., "shared" validity tag 110A, permission(s) 110D, object type 110E, and/or bounds 110B), for example, with a (e.g., permanent) mapping of the register storing the non-unique part from the register storing the unique part (e.g., in the example above, with such a bit set in RBX and RCX indicating they are logically paired with RAX). Yet another example implementation is to encode that indication into the instruction (e.g., prefix) itself, e.g., such that corresponding instructions for multiple capabilities are to access a same register storing the shared non-unique part of their capabilities (e.g., validity tag 110A, permission(s) 110D, object type 110E, and/or bounds 110B). The register containing the non-unique part of the capabilities may be encoded into the instruction.

In certain examples, a processor (e.g., capability management circuit 108) is to (e.g., dynamically) detect the overlap between two (or more) capabilities and combine the overlapping data such that fewer registers are utilized. For example, the processor may execute a capability instruction that is used to modify the address within the capability and place the resultant capability into a different software-visible register. If some registers containing one or more portions of the capability are unchanged from the original capability value, then the processor may detect that those portions share storage. In other examples, the processor may scan some or all register contents to identify duplicated capability portions and combine the register storage for those capability portions. It may still appear to software that completely separate registers are used, but the processor may allocate a shared physical register for separate software-visible registers containing capability portions. The processor may dynamically allocate a new physical register to store a modified version of a capability portion that was previously shared if that portion of the capability is modified via one or more of the software-visible registers containing that portion of the capability.

Example Load Capability Instruction Format

In certain examples, a load capability (LoadCap) instruction is to load a capability from the source (e.g., memory) operand into the register pair whose first register is encoded in the destination operand (e.g., and also load the associated valid bit from the memory into the register storage for the associated valid bit).

In certain examples, the format of the LoadCap instruction is:

LoadCap dest:r64pair, src:m128 where LoadCap is the mnemonic (e.g., corresponding to an opcode), dest:r64pair is one destination register of a plurality of destination registers (e.g., each having a 64-bit width) where the capability is to be stored (e.g., along with the corresponding validity tag), and the src:m128 is a source memory address storing the capability (e.g., having a 128-bit width). The bit widths are example numbers and it should be understood that other values may be utilized.

Figure 4:
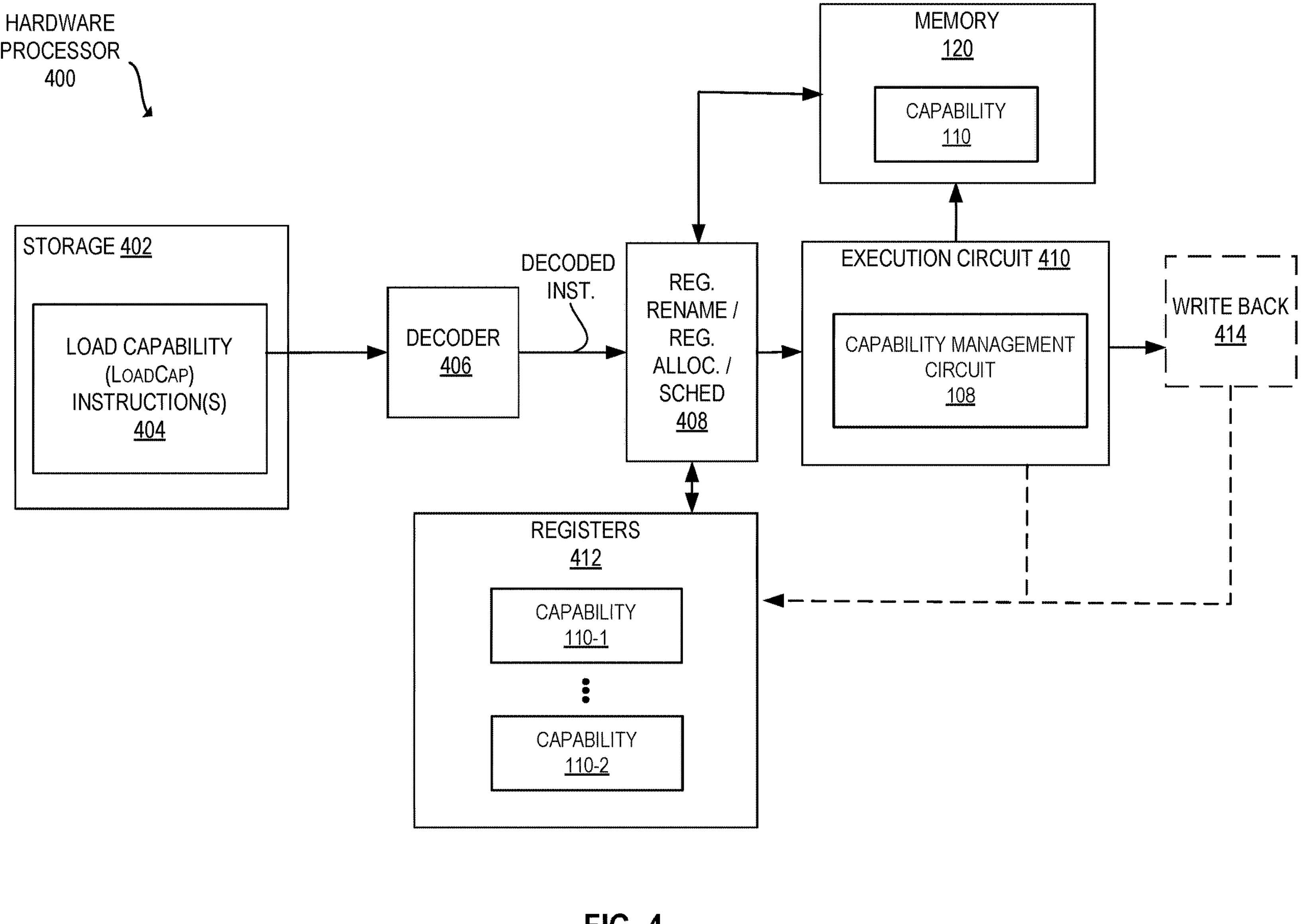
FIG. 4 illustrates a hardware processor coupled to storage that includes one or more load capability instructions according to examples of the disclosure.

FIG. 4 illustrates a hardware processor 400 coupled to storage 402 that includes one or more load capability (LoadCap) instructions 404 according to examples of the disclosure. In certain examples, a LoadCap instruction is according to any of the disclosure herein. In certain examples, a LoadCap instruction includes a field indicating it is allowed (e.g., has the capability) to access a certain capability stored in memory (e.g., and access the destination registers).

In certain examples, e.g., in response to a request to perform a LoadCap operation, the instruction 404 (e.g., macro-instruction) is fetched from storage 402 and sent to decoder 406. In the depicted example, the decoder 406 (e.g., decoder circuit) decodes the instruction into a decoded instruction (e.g., one or more micro-instructions or micro-operations). The decoded instruction is then sent for execution, e.g., via scheduler circuit 408 to schedule the decoded instruction for execution.

In certain examples, (e.g., where the processor/core supports out-of-order (OoO) execution), the processor includes a register rename/allocator circuit 408 coupled to register file 412 (e.g., and memory 120) to allocate resources and perform register renaming on registers (e.g., registers associated with the initial sources and final destination of the instruction). In certain examples, (e.g., for out-of-order execution), the processor includes one or more scheduler circuits 408 coupled to the decoder 406. The scheduler circuit(s) may schedule one or more operations associated with decoded instructions, including one or more operations decoded from a LoadCap instruction 404, e.g., for execution on the execution circuit 410. In the depicted example, capability management circuit 108 is within the execution circuit 410.

As one example, a decoded LoadCap instruction 404 is to cause capability 110 to be loaded (e.g., copied) from memory 120 into a plurality of registers 412 that split the single capability into a first register storing the first part 110-1 of the capability and a second register storing the second part 110-2 of the capability (e.g., and optionally, any additional register used to store a part of the single capability). In certain examples, the execution includes checking by capability management circuit 108 that the requested load is permitted.

In certain examples, a write back circuit 414 is included to write back results of an instruction to a destination (e.g., write them to registers 412), for example, so those results are visible within a processor (e.g., visible outside of the execution circuit that produced those results).

One or more of these components (e.g., decoder 406, register rename/register allocator/scheduler 408, execution circuit 410, registers (e.g., register file) 412, memory 120, or write back circuit 414) may be in a single core of a hardware processor (e.g., and multiple cores each with an instance of these components).

Figure 5:
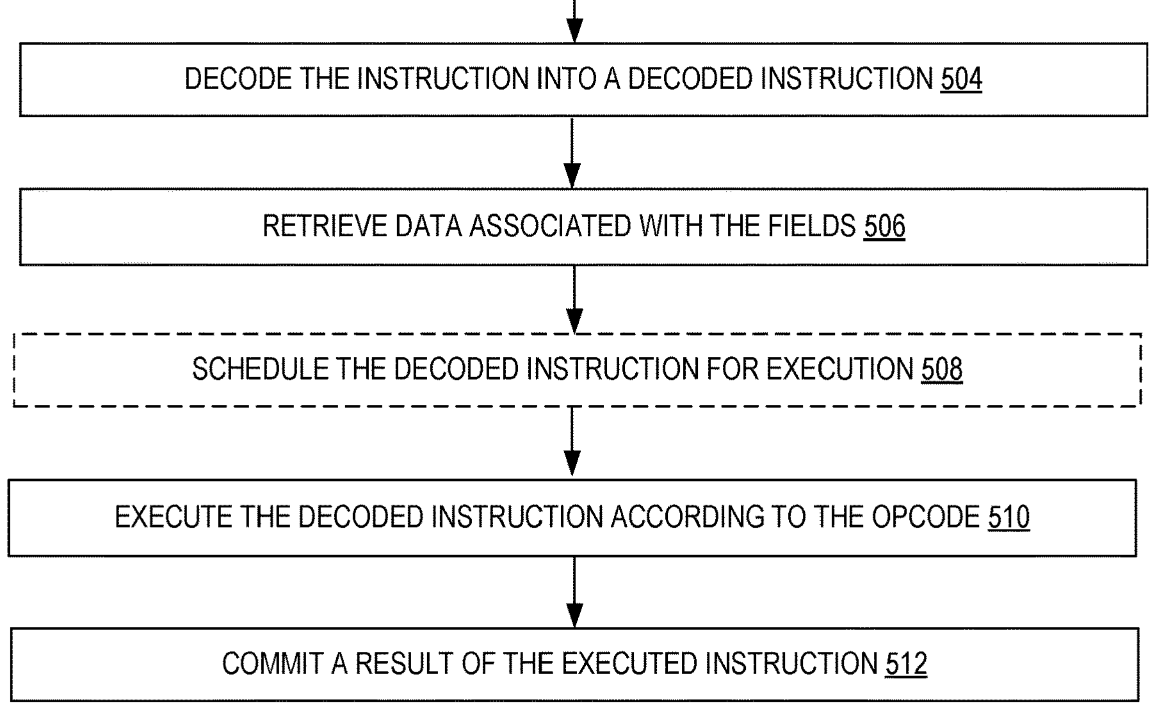
FIG. 5 illustrates a method of processing a load capability instruction according to examples of the disclosure.

FIG. 5 illustrates a method 500 of processing a load capability instruction according to examples of the disclosure. In certain examples, a processor (e.g., or processor core) performs method 500, e.g., in response to receiving a request to execute an instruction from software. Depicted method 500 includes processing a single LoadCap instruction by: fetch the LoadCap instruction comprising fields to indicate a memory address that stores a capability and a single destination register, and an opcode to indicate that an execution circuit is to load a first proper subset of the address field and the bounds field of the capability (e.g., just the address field or just the bounds field) (e.g., and/or any other field from FIG. 3B) from the memory address into the single destination register and load a second proper subset of the address field and the bounds field of the capability (e.g., the other of the address field or the bounds field) from the memory address into an implicit second destination register at 502 (e.g., and load a corresponding validity bit in a third register), decode the instruction into a decoded instruction at 504, retrieve data associated with the fields at 506, (optionally) schedule the decoded instruction for execution at 508, execute the decoded instruction according to the opcode at 510, and commit a result of the executed instruction at 512.

Example Store Capability Instruction Format

In certain examples, a store capability (StoreCap) instruction is to store a capability from the register pair whose first register is encoded in the source operand into the source (e.g., memory) operand (e.g., and store the associated valid bit from a register into the associated valid bit storage in memory).

In certain examples, the format of the StoreCap instruction is:

StoreCap dest:m128, src:r64pair where StoreCap is the mnemonic (e.g., corresponding to an opcode), src:r64pair is one source register of a plurality of source registers (e.g., each having a 64-bit width) where the capability is currently stored (e.g., along with the corresponding validity tag), and dest:m128 is a destination memory address (e.g., for storage having a 128-bit width) where the capability is to be stored. The bit widths are example numbers and it should be understood that other values may be utilized.

Figure 6:
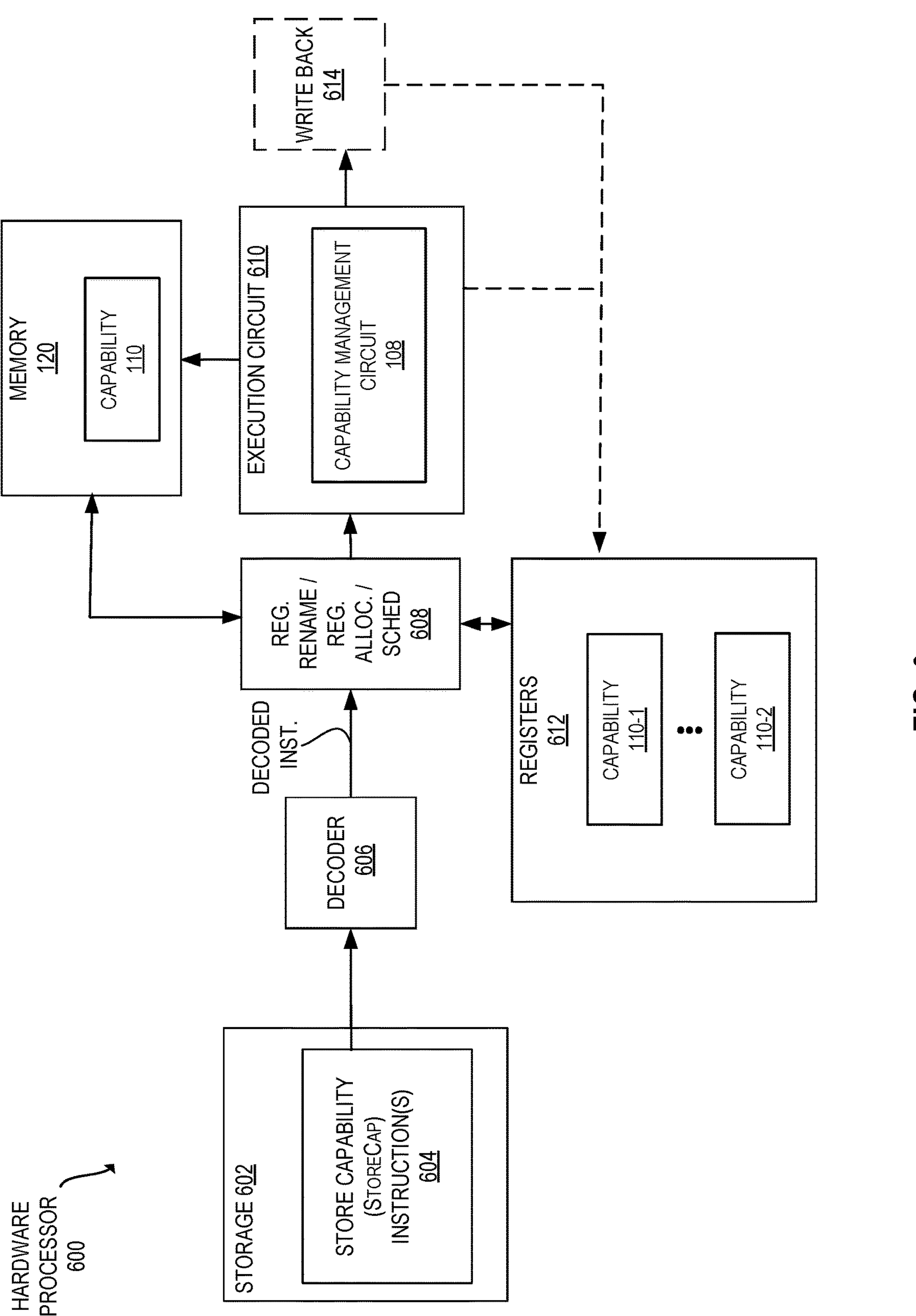
FIG. 6 illustrates a hardware processor coupled to storage that includes one or more store capability instructions according to examples of the disclosure.

FIG. 6 illustrates a hardware processor 600 coupled to storage that includes one or more store capability instructions 604 according to examples of the disclosure. In certain examples, a StoreCap instruction is according to any of the disclosure herein. In certain examples, a StoreCap instruction includes a field indicating it is allowed (e.g., has the capability) to access a destination in memory that is to store a certain capability sourced from the source registers (e.g., and is allowed to access the source registers).

In certain examples, e.g., in response to a request to perform a StoreCap operation, the instruction (e.g., macro-instruction) 604 is fetched from storage 602 and sent to decoder 606. In the depicted example, the decoder 606 (e.g., decoder circuit) decodes the instruction into a decoded instruction (e.g., one or more micro-instructions or micro-operations). The decoded instruction is then sent for execution, e.g., via scheduler circuit 608 to schedule the decoded instruction for execution.

In certain examples, (e.g., where the processor/core supports out-of-order (OoO) execution), the processor includes a register rename/allocator circuit 608 coupled to register file 612 (e.g., and memory 120) to allocate resources and perform register renaming on registers (e.g., registers associated with the initial sources and final destination of the instruction). In certain examples, (e.g., for out-of-order execution), the processor includes one or more scheduler circuits 608 coupled to the decoder 606. The scheduler circuit(s) may schedule one or more operations associated with decoded instructions, including one or more operations decoded from a StoreCap instruction 604, e.g., for execution on the execution circuit 610. In the depicted example, capability management circuit 108 is within the execution circuit 610.

As one example, a decoded StoreCap instruction 604 is to cause the first part 110-1 of the single capability from the first register and the second part 110-2 of the single capability from the second register (e.g., and optionally, any additional register used to store a part of the single capability) to be stored into the memory 120 as capability 110 (e.g., in a single continuous block of memory). In certain examples, the execution includes checking by capability management circuit 108 that the requested store is permitted.

In certain examples, a write back circuit 614 is included to write back results of an instruction to a destination (e.g., write them to memory 120), for example, so those results are visible within the memory 120 (e.g., visible outside of the execution circuit that produced those results).

One or more of these components (e.g., decoder 606, register rename/register allocator/scheduler 608, execution circuit 610, registers (e.g., register file) 612, memory 120, or write back circuit 614) may be in a single core of a hardware processor (e.g., and multiple cores each with an instance of these components).

FIG. 7 illustrates a method 700 of processing a store capability instruction according to examples of the disclosure. In certain examples, a processor (e.g., or processor core) performs method 700, e.g., in response to receiving a request to execute an instruction from software. Depicted method 700 includes processing a single StoreCap instruction by: fetch the StoreCap instruction comprising fields to indicate a memory address to store a capability and a single source register, and an opcode to indicate that an execution circuit is to store a first proper subset of an address field and a bounds field of the capability (e.g., just the address field or just the bounds field) (e.g., and/or any other field from FIG. 3B) from the single source register to the memory address and a second proper subset of the address field and the bounds field of the capability (e.g., the other of the address field or the bounds field) from an implicit second source register to the memory address at 702 (e.g., and store a corresponding validity bit from a third register), decode the instruction into a decoded instruction at 704, retrieve data associated with the fields at 706, (optionally) schedule the decoded instruction for execution at 708, execute the decoded instruction according to the opcode at 710, and commit a result of the executed instruction at 712.

Exemplary architectures, systems, etc. that the above may be used in are detailed below. Exemplary instruction formats for capability instructions are detailed below.

At least some examples of the disclosed technologies can be described in view of the following examples:

Example 1. An apparatus comprising:
- a capability management circuit to check a capability for a memory access request, the capability comprising an address field, a validity field, and a bounds field that is to indicate a lower bound and an upper bound of an address space to which the capability authorizes access;
- a decoder circuit to decode a single instruction into a decoded single instruction, the single instruction comprising fields to indicate a memory address that stores the capability and a single destination register, and an opcode to indicate that an execution circuit is to load a first proper subset of the address field and the bounds field of the capability from the memory address into the single destination register and load a second proper subset of the address field and the bounds field of the capability from the memory address into an implicit second destination register; and
- the execution circuit to execute the decoded single instruction according to the opcode.

Example 2. The apparatus of example 1, wherein the opcode is to further indicate that the execution circuit is to load a value of the validity field from the memory address into an implicit third destination register.

Example 3. The apparatus of example 2, wherein the value of the validity field is loaded into a first proper subset of the implicit third destination register;
- the decoder circuit is to decode a second single instruction into a decoded second single instruction, the second single instruction comprising fields to indicate a second memory address that stores a second capability and a fourth single destination register, and an opcode to indicate that the execution circuit is to load a first proper subset of an address field and a bounds field of the second capability from the second memory address into the fourth single destination register, a second proper subset of the address field and the bounds field of the second capability from the second memory address into an implicit fifth destination register, and a value of the validity field from the second memory address into a second proper subset of the implicit third destination register; and
- the execution circuit to execute the decoded second single instruction according to its opcode.

Example 4. The apparatus of example 2, wherein the capability management circuit is to clear a value of the validity field loaded into the implicit third destination register in response to detection of a write to either of the single destination register and the implicit second destination register by a non-capability instruction.

Example 5. The apparatus of example 1, wherein the capability comprises a permission field that is to indicate how the capability is permitted to be used.

Example 6. The apparatus of example 1, wherein the capability comprises an object type field that is to indicate an object type of the capability.

Example 7. The apparatus of example 1, wherein the opcode is to indicate that the execution circuit is to lock a memory comprising the memory address until the loads of both the first proper subset of the capability from the memory address into the single destination register, and the second proper subset of the capability from the memory address into the implicit second destination register are complete.

Example 8. The apparatus of example 1, wherein:
- the decoder circuit is to decode a second single instruction into a decoded second single instruction, the second single instruction comprising fields to indicate a second memory address to store a second capability and a single source register, and an opcode to indicate that the execution circuit is to store a first proper subset of an address field and a bounds field of the second capability from the single source register to the second memory address and a second proper subset of the address field and the bounds field of the second capability from an implicit second source register to the second memory address; and
- the execution circuit to execute the decoded second single instruction according to its opcode.

Example 9. The apparatus of example 1, wherein the implicit second destination register is a next logical register after the single destination register.

Example 10. A method comprising:

checking, by a capability management circuit of a processor core, a capability for a memory access request, the capability comprising an address field, a validity field, and a bounds field that is to indicate a lower bound and an upper bound of an address space to which the capability authorizes access;

decoding, by a decoder circuit of the processor core, a single instruction into a decoded single instruction, the single instruction comprising fields to indicate a memory address that stores the capability and a single destination register, and an opcode to indicate that an execution circuit of the processor core is to load a first proper subset of the address field and the bounds field of the capability from the memory address into the single destination register and load a second proper subset of the address field and the bounds field of the capability from the memory address into an implicit second destination register; and executing, by the execution circuit, the decoded single instruction according to the opcode.

Example 11. The method of example 10, wherein the opcode is to further indicate that the execution circuit is to load a value of the validity field from the memory address into an implicit third destination register.

Example 12. The method of example 11, wherein the value of the validity field is loaded into a first proper subset of the implicit third destination register, and further comprising:

decoding, by the decoder circuit, a second single instruction into a decoded second single instruction, the second single instruction comprising fields to indicate a second memory address that stores a second capability and a fourth single destination register, and an opcode to indicate that the execution circuit is to load a first proper subset of an address field and a bounds field of the second capability from the second memory address into the fourth single destination register, a second proper subset of the address field and the bounds field of the second capability from the second memory address into an implicit fifth destination register, and a value of the validity field from the second memory address into a second proper subset of the implicit third destination register; and executing, by the execution circuit, the decoded second single instruction according to its opcode.

Example 13. The method of example 11, further comprising clearing, by the capability management circuit, a value of the validity field loaded into the implicit third destination register in response to detecting a write to either of the single destination register and the implicit second destination register by a non-capability instruction.

Example 14. The method of example 10, wherein the capability comprises a permission field that is to indicate how the capability is permitted to be used.

Example 15. The method of example 10, wherein the capability comprises an object type field that is to indicate an object type of the capability.

Example 16. The method of example 10, wherein the opcode is to indicate that the execution circuit is to lock a memory comprising the memory address until the loads of both the first proper subset of the capability from the memory address into the single destination register, and the second proper subset of the capability from the memory address into the implicit second destination register are complete.

Example 17. The method of example 10, further comprising:

decoding, by the decoder circuit, a second single instruction into a decoded second single instruction, the second single instruction comprising fields to indicate a second memory address to store a second capability and a single source register, and an opcode to indicate that the execution circuit is to store a first proper subset of an address field and a bounds field of the second capability from the single source register to the second memory address and a second proper subset of the address field and the bounds field of the second capability from an implicit second source register to the second memory address; and executing, by the execution circuit, the decoded second single instruction according to its opcode.

Example 18. A non-transitory machine readable medium that stores code that when executed by a machine causes the machine to perform a method comprising:

checking, by a capability management circuit of a processor core, a capability for a memory access request, the capability comprising an address field, a validity field, and a bounds field that is to indicate a lower bound and an upper bound of an address space to which the capability authorizes access;

decoding, by a decoder circuit of the processor core, a single instruction into a decoded single instruction, the single instruction comprising fields to indicate a memory address that stores the capability and a single destination register, and an opcode to indicate that an execution circuit of the processor core is to load a first proper subset of the address field and the bounds field of the capability from the memory address into the single destination register and load a second proper subset of the address field and the bounds field of the capability from the memory address into an implicit second destination register; and executing, by the execution circuit, the decoded single instruction according to the opcode.

Example 19. The non-transitory machine readable medium of example 18, wherein the opcode is to further indicate that the execution circuit is to load a value of the validity field from the memory address into an implicit third destination register.

Example 20. The non-transitory machine readable medium of example 19, wherein the value of the validity field is loaded into a first proper subset of the implicit third destination register, and the method further comprises:

decoding, by the decoder circuit, a second single instruction into a decoded second single instruction, the second single instruction comprising fields to indicate a second memory address that stores a second capability and a fourth single destination register, and an opcode to indicate that the execution circuit is to load a first proper subset of an address field and a bounds field of the second capability from the second memory address into the fourth single destination register, a second proper subset of the address field and the bounds field of the second capability from the second memory address into an implicit fifth destination register, and a value of the validity field from the second memory address into a second proper subset of the implicit third destination register; and executing, by the execution circuit, the decoded second single instruction according to its opcode.

Example 21. The non-transitory machine readable medium of example 19, wherein the method further comprises clearing, by the capability management circuit, a value of the validity field loaded into the implicit third destination register in response to detecting a write to either of the single destination register and the implicit second destination register by a non-capability instruction.

Example 22. The non-transitory machine readable medium of example 18, wherein the capability comprises a permission field that is to indicate how the capability is permitted to be used.

Example 23. The non-transitory machine readable medium of example 18, wherein the capability comprises an object type field that is to indicate an object type of the capability.

Example 24. The non-transitory machine readable medium of example 18, wherein the opcode is to indicate that the execution circuit is to lock a memory comprising the memory address until the loads of both the first proper subset of the capability from the memory address into the single destination register, and the second proper subset of the capability from the memory address into the implicit second destination register are complete.

Example 25. The non-transitory machine readable medium of example 18, wherein the method further comprises:

decoding, by the decoder circuit, a second single instruction into a decoded second single instruction, the second single instruction comprising fields to indicate a second memory address to store a second capability and a single source register, and an opcode to indicate that the execution circuit is to store a first proper subset of an address field and a bounds field of the second capability from the single source register to the second memory address and a second proper subset of the address field and the bounds field of the second capability from an implicit second source register to the second memory address; and executing, by the execution circuit, the decoded second single instruction according to its opcode.

In yet another example, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While examples are described in which both vector and scalar operations are supported through the vector friendly instruction format, alternative examples use only vector operations the vector friendly instruction format.

FIGS. 8A-8B are block diagrams illustrating a generic vector friendly instruction format and instruction templates thereof according to examples of the disclosure. FIG. 8A is a block diagram illustrating a generic vector friendly instruction format and class A instruction templates thereof according to examples of the disclosure; while FIG. 8B is a block diagram illustrating the generic vector friendly instruction format and class B instruction templates thereof according to examples of the disclosure. Specifically, a generic vector friendly instruction format 800 for which are defined class A and class B instruction templates, both of which include no memory access 805 instruction templates and memory access 820 instruction templates. The term generic in the context of the vector friendly instruction format refers to the instruction format not being tied to any specific instruction set.

While examples of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative examples may support more, less and/or different vector operand sizes (e.g., 256 byte vector operands) with more, less, or different data element widths (e.g., 128 bit (16 byte) data element widths).

The class A instruction templates in FIG. 8A include: 1) within the no memory access 805 instruction templates there is shown a no memory access, full round control type operation 810 instruction template and a no memory access, data transform type operation 815 instruction template; and 2) within the memory access 820 instruction templates there is shown a memory access, temporal 825 instruction template and a memory access, non-temporal 830 instruction template. The class B instruction templates in FIG. 8B include: 1) within the no memory access 805 instruction templates there is shown a no memory access, write mask control, partial round control type operation 812 instruction template and a no memory access, write mask control, vsize type operation 817 instruction template; and 2) within the memory access 820 instruction templates there is shown a memory access, write mask control 827 instruction template.

The generic vector friendly instruction format 800 includes the following fields listed below in the order illustrated in FIGS. 8A-8B.

Format field 840—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 842—its content distinguishes different base operations.

Register index field 844—its content, directly or through address generation, specifies the locations of the source and destination operands, be they in registers or in memory. These include a sufficient number of bits to select N registers from a P×Q (e.g., 32×512, 16×128, 32×1024, 64×1024) register file. While in one example N may be up to three sources and one destination register, alternative examples may support more or less sources and destination registers (e.g., may support up to two sources where one of these sources also acts as the destination, may support up to three sources where one of these sources also acts as the destination, may support up to two sources and one destination).

Modifier field 846—its content distinguishes occurrences of instructions in the generic vector instruction format that specify memory access from those that do not; that is, between no memory access 805 instruction templates and memory access 820 instruction templates. Memory access operations read and/or write to the memory hierarchy (in some cases specifying the source and/or destination addresses using values in registers), while non-memory access operations do not (e.g., the source and destinations are registers). While in one example this field also selects between three different ways to perform memory address calculations, alternative examples may support more, less, or different ways to perform memory address calculations.

Augmentation operation field 850—its content distinguishes which one of a variety of different operations to be performed in addition to the base operation. This field is context specific. In one example of the disclosure, this field is divided into a class field 868, an alpha field 852, and a beta field 854. The augmentation operation field 850 allows common groups of operations to be performed in a single instruction rather than 2, 3, or 4 instructions.

Scale field 860—its content allows for the scaling of the index field's content for memory address generation (e.g., for address generation that uses $2^{scale}$*index+base).

Displacement Field 862A—its content is used as part of memory address generation (e.g., for address generation that uses $2^{scale}$*index+base+displacement).

Displacement Factor Field 862B (note that the juxtaposition of displacement field 862A directly over displacement factor field 862B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 874 (described later herein) and the data manipulation field 854C. The displacement field 862A and the displacement factor field 862B are optional in the sense that they are not used for the no memory access 805 instruction templates and/or different examples may implement only one or none of the two.

Data element width field 864—its content distinguishes which one of a number of data element widths is to be used (in some examples for all instructions; in other examples for only some of the instructions). This field is optional in the sense that it is not needed if only one data element width is supported and/or data element widths are supported using some aspect of the opcodes.

Write mask field 870—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 870 allows for partial vector operations, including loads, stores, arithmetic, logical, etc. While examples of the disclosure are described in which the write mask field's 870 content selects one of a number of write mask registers that contains the write mask to be used (and thus the write mask field's 870 content indirectly identifies that masking to be performed), alternative examples instead or additional allow the mask write field's 870 content to directly specify the masking to be performed.

Immediate field 872—its content allows for the specification of an immediate. This field is optional in the sense that is it not present in an implementation of the generic vector friendly format that does not support immediate, and it is not present in instructions that do not use an immediate.

Class field 868—its content distinguishes between different classes of instructions. With reference to FIGS. 8A-B, the contents of this field select between class A and class B instructions. In FIGS. 8A-B, rounded corner squares are used to indicate a specific value is present in a field (e.g., class A 868A and class B 868B for the class field 868 respectively in FIGS. 8A-B).

Instruction Templates of Class A

In the case of the non-memory access 805 instruction templates of class A, the alpha field 852 is interpreted as an RS field 852A, whose content distinguishes which one of the different augmentation operation types are to be performed (e.g., round 852A.1 and data transform 852A.2 are respectively specified for the no memory access, round type operation 810 and the no memory access, data transform type operation 815 instruction templates), while the beta field 854 distinguishes which of the operations of the specified type is to be performed. In the no memory access 805 instruction templates, the scale field 860, the displacement field 862A, and the displacement scale filed 862B are not present.

No-Memory Access Instruction Templates—Full Round Control Type Operation

In the no memory access full round control type operation 810 instruction template, the beta field 854 is interpreted as a round control field 854A, whose content(s) provide static rounding. While in the described examples of the disclosure the round control field 854A includes a suppress all floating-point exceptions (SAE) field 856 and a round operation control field 858, alternative examples may support may encode both these concepts into the same field or only have one or the other of these concepts/fields (e.g., may have only the round operation control field 858).

SAE field 856—its content distinguishes whether or not to disable the exception event reporting; when the SAE field's 856 content indicates suppression is enabled, a given instruction does not report any kind of floating-point exception flag and does not raise any floating-point exception handler.

Round operation control field 858—its content distinguishes which one of a group of rounding operations to perform (e.g., Round-up, Round-down, Round-towards-zero and Round-to-nearest). Thus, the round operation control field 858 allows for the changing of the rounding mode on a per instruction basis. In one example of the disclosure where a processor includes a control register for specifying rounding modes, the round operation control field's 850 content overrides that register value.

No Memory Access Instruction Templates—Data Transform Type Operation

In the no memory access data transform type operation 815 instruction template, the beta field 854 is interpreted as a data transform field 854B, whose content distinguishes which one of a number of data transforms is to be performed (e.g., no data transform, swizzle, broadcast).

In the case of a memory access 820 instruction template of class A, the alpha field 852 is interpreted as an eviction hint field 852B, whose content distinguishes which one of the eviction hints is to be used (in FIG. 8A, temporal 852B.1 and non-temporal 852B.2 are respectively specified for the memory access, temporal 825 instruction template and the memory access, non-temporal 830 instruction template), while the beta field 854 is interpreted as a data manipulation field 854C, whose content distinguishes which one of a number of data manipulation operations (also known as primitives) is to be performed (e.g., no manipulation; broadcast; up conversion of a source; and down conversion of a destination). The memory access 820 instruction templates include the scale field 860, and optionally the displacement field 862A or the displacement scale field 862B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 852 is interpreted as a write mask control (Z) field 852C, whose content distinguishes whether the write masking controlled by the write mask field 870 should be a merging or a zeroing.

In the case of the non-memory access 805 instruction templates of class B, part of the beta field 854 is interpreted as an RL field 857A, whose content distinguishes which one of the different augmentation operation types are to be performed (e.g., round 857A.1 and vector length (VSIZE) 857A.2 are respectively specified for the no memory access, write mask control, partial round control type operation 812 instruction template and the no memory access, write mask control, VSIZE type operation 817 instruction template), while the rest of the beta field 854 distinguishes which of the operations of the specified type is to be performed. In the no memory access 805 instruction templates, the scale field 860, the displacement field 862A, and the displacement scale filed 862B are not present.

In the no memory access, write mask control, partial round control type operation 810 instruction template, the rest of the beta field 854 is interpreted as a round operation field 859A and exception event reporting is disabled (a given instruction does not report any kind of floating-point exception flag and does not raise any floating-point exception handler).

Round operation control field 859A—just as round operation control field 858, its content distinguishes which one of a group of rounding operations to perform (e.g., Round-up, Round-down, Round-towards-zero and Round-to-nearest). Thus, the round operation control field 859A allows for the changing of the rounding mode on a per instruction basis. In one example of the disclosure where a processor includes a control register for specifying rounding modes, the round operation control field's 850 content overrides that register value.

In the no memory access, write mask control, VSIZE type operation 817 instruction template, the rest of the beta field 854 is interpreted as a vector length field 859B, whose content distinguishes which one of a number of data vector lengths is to be performed on (e.g., 128, 256, or 512 byte).

In the case of a memory access 820 instruction template of class B, part of the beta field 854 is interpreted as a broadcast field 857B, whose content distinguishes whether or not the broadcast type data manipulation operation is to be performed, while the rest of the beta field 854 is interpreted the vector length field 859B. The memory access 820 instruction templates include the scale field 860, and optionally the displacement field 862A or the displacement scale field 862B.

With regard to the generic vector friendly instruction format 800, a full opcode field 874 is shown including the format field 840, the base operation field 842, and the data element width field 864. While one example is shown where the full opcode field 874 includes all of these fields, the full opcode field 874 includes less than all of these fields in examples that do not support all of them. The full opcode field 874 provides the operation code (opcode).

The augmentation operation field 850, the data element width field 864, and the write mask field 870 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some examples of the disclosure, different processors or different cores within a processor may support only class A, only class B, or both classes. For instance, a high-performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general-purpose cores, one of the graphics cores intended primarily for graphics and/or scientific computing may support only class A, while one or more of the general-purpose cores may be high-performance general-purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different examples of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 9 is a block diagram illustrating an exemplary specific vector friendly instruction format according to examples of the disclosure. FIG. 9 shows a specific vector friendly instruction format 900 that is specific in the sense that it specifies the location, size, interpretation, and order of the fields, as well as values for some of those fields. The specific vector friendly instruction format 900 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 8 into which the fields from FIG. 9 map are illustrated.

It should be understood that, although examples of the disclosure are described with reference to the specific vector friendly instruction format 900 in the context of the generic vector friendly instruction format 800 for illustrative purposes, the disclosure is not limited to the specific vector friendly instruction format 900 except where claimed. For example, the generic vector friendly instruction format 800 contemplates a variety of possible sizes for the various fields, while the specific vector friendly instruction format 900 is shown as having fields of specific sizes. By way of specific example, while the data element width field 864 is illustrated as a one bit field in the specific vector friendly instruction format 900, the disclosure is not so limited (that is, the generic vector friendly instruction format 800 contemplates other sizes of the data element width field 864).

The generic vector friendly instruction format 800 includes the following fields listed below in the order illustrated in FIG. 9A.

EVEX Prefix (Bytes 0-3) 902—is encoded in a four-byte form.

Format Field 840 (EVEX Byte 0, bits [7:0])—the first byte (EVEX Byte 0) is the format field 840 and it contains 0x62 (the unique value used for distinguishing the vector friendly instruction format in one example of the disclosure).

The second-fourth bytes (EVEX Bytes 1-3) include a number of bit fields providing specific capability.

REX field 905 (EVEX Byte 1, bits [7-5])—consists of an EVEX.R bit field (EVEX Byte 1, bit [7]-R), EVEX.X bit field (EVEX byte 1, bit [6]-X), and 857BEX byte 1, bit[5]—B). The EVEX.R, EVEX.X, and EVEX.B bit fields provide the same functionality as the corresponding VEX bit fields, and are encoded using is complement form, e.g., ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 810—this is the first part of the REX' field 810 and is the EVEX.R' bit field (EVEX Byte 1, bit [4]-R') that is used to encode either the upper 16 or lower 16 of the extended 32 register set. In one example of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative examples of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 915 (EVEX byte 1, bits [3:0]-mmmm)—its content encodes an implied leading opcode byte (OF, OF 38, or OF 3).

Data element width field 864 (EVEX byte 2, bit [7]-W)—is represented by the notation EVEX.W. EVEX.W is used to define the granularity (size) of the datatype (either 32-bit data elements or 64-bit data elements).

EVEX.vvvv 920 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 920 encodes the 4 low-order bits of the first source register specifier stored in inverted (1s complement) form. Depending on the instruction, an extra different EVEX bit field is used to extend the specifier size to 32 registers.

EVEX.U 868 Class field (EVEX byte 2, bit [2]-U)—If EVEX.0=0, it indicates class A or EVEX.U0; if EVEX.0=1, it indicates class B or EVEX.U1.

Prefix encoding field 925 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one example, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain examples expand in a similar fashion for consistency but allow for different meanings to be specified by these legacy SIMD prefixes. An alternative example may redesign the PLA to support the 2-bit SIMD prefix encodings, and thus not require the expansion.

Alpha field 852 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 854 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 810—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 870 (EVEX byte 3, bits [2:0]-kkk)—its content specifies the index of a register in the write mask registers as previously described. In one example of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 930 (Byte 4) is also known as the opcode byte. Part of the opcode is specified in this field.

MOD R/M Field 940 (Byte 5) includes MOD field 942, Reg field 944, and R/M field 946. As previously described, the MOD field's 942 content distinguishes between memory access and non-memory access operations. The role of Reg field 944 can be summarized to two situations: encoding either the destination register operand or a source register operand, or be treated as an opcode extension and not used to encode any instruction operand. The role of R/M field 946 may include the following: encoding the instruction operand that references a memory address, or encoding either the destination register operand or a source register operand.

Scale, Index, Base (SIB) Byte (Byte 6)—As previously described, the scale field's 850 content is used for memory address generation. SIB.xxx 954 and SIB.bbb 956—the contents of these fields have been previously referred to with regard to the register indexes Xxxx and Bbbb.

Displacement field 862A (Bytes 7-10)—when MOD field 942 contains 10, bytes 7-10 are the displacement field 862A, and it works the same as the legacy 32-bit displacement (disp32) and works at byte granularity.

Displacement factor field 862B (Byte 7)—when MOD field 942 contains 01, byte 7 is the displacement factor field 862B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 862B is a reinterpretation of disp8; when using displacement factor field 862B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 862B substitutes the legacy x86 instruction set 8-bit displacement. Thus, the displacement factor field 862B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 872 operates as previously described.

Full Opcode Field

FIG. 9B is a block diagram illustrating the fields of the specific vector friendly instruction format 900 that make up the full opcode field 874 according to one example of the disclosure. Specifically, the full opcode field 874 includes the format field 840, the base operation field 842, and the data element width (W) field 864. The base operation field 842 includes the prefix encoding field 925, the opcode map field 915, and the real opcode field 930.

Register Index Field

FIG. 9C is a block diagram illustrating the fields of the specific vector friendly instruction format 900 that make up the register index field 844 according to one example of the disclosure. Specifically, the register index field 844 includes the REX field 905, the REX' field 910, the MODR/M.reg field 944, the MODR/M.r/m field 946, the VVVV field 920, xxx field 954, and the bbb field 956.

Augmentation Operation Field

FIG. 9D is a block diagram illustrating the fields of the specific vector friendly instruction format 900 that make up the augmentation operation field 850 according to one example of the disclosure. When the class (U) field 868 contains 0, it signifies EVEX.U0 (class A 868A); when it contains 1, it signifies EVEX.U1 (class B 868B). When U=0 and the MOD field 942 contains 11 (signifying a no memory access operation), the alpha field 852 (EVEX byte 3, bit [7]-EH) is interpreted as the rs field 852A. When the rs field 852A contains a 1 (round 852A.1), the beta field 854 (EVEX byte 3, bits [6:4]-SSS) is interpreted as the round control field 854A. The round control field 854A includes a one bit SAE field 856 and a two bit round operation field 858. When the rs field 852A contains a 0 (data transform 852A.2), the beta field 854 (EVEX byte 3, bits [6:4]-SSS) is interpreted as a three bit data transform field 854B. When U=0 and the MOD field 942 contains 00, 01, or 10 (signifying a memory access operation), the alpha field 852 (EVEX byte 3, bit [7]-EH) is interpreted as the eviction hint (EH) field 852B and the beta field 854 (EVEX byte 3, bits [6:4]-SSS) is interpreted as a three bit data manipulation field 854C.

When U=1, the alpha field 852 (EVEX byte 3, bit [7]-EH) is interpreted as the write mask control (Z) field 852C. When U=1 and the MOD field 942 contains 11 (signifying a no memory access operation), part of the beta field 854 (EVEX byte 3, bit [4]-$S_0$) is interpreted as the RL field 857A; when it contains a 1 (round 857A.1) the rest of the beta field 854 (EVEX byte 3, bit [6-5]-$S_{2-1}$) is interpreted as the round operation field 859A, while when the RL field 857A contains a 0 (VSIZE 857.A2) the rest of the beta field 854 (EVEX byte 3, bit [6-5]-$S_{2-1}$) is interpreted as the vector length field 859B (EVEX byte 3, bit [6-5]-$L_{1-0}$). When U=1 and the MOD field 942 contains 00, 01, or 10 (signifying a memory access operation), the beta field 854 (EVEX byte 3, bits [6:4]-SSS) is interpreted as the vector length field 859B (EVEX byte 3, bit [6-5]-$L_{1-0}$) and the broadcast field 857B (EVEX byte 3, bit [4]-B).

Exemplary Register Architecture

Figure 10:
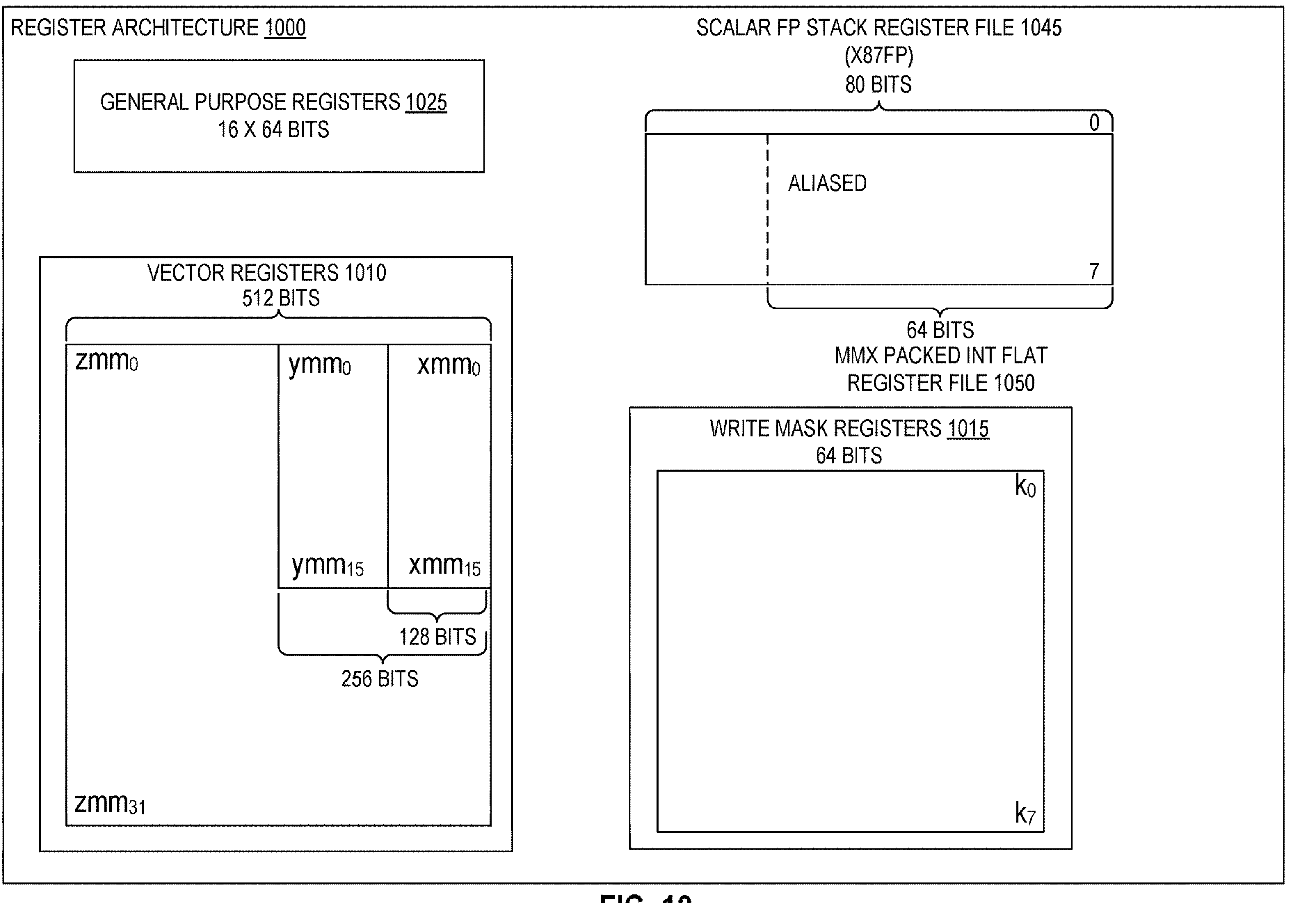
FIG. 10 is a block diagram of a register architecture according to one example of the disclosure

FIG. 10 is a block diagram of a register architecture 1000 according to one example of the disclosure. In the example illustrated, there are 32 vector registers 1010 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 900 operates on these overlaid register file as illustrated in the below tables.

| Adjustable Vector Length | Class | Operations | Registers |
|---|---|---|---|
| Instruction Templates that do not include the vector length field 859B | A (FIG. 8A; U = 0) | 810, 815, 825, 830 | zmm registers (the vectorl ength is 64 byte) |
| | B (FIG. 8B; U = 1) | 812 | zmm registers (the vector length is 64 byte) |
| Instruction templates that do include the vector length field 859B | B (FIG. 8B; U = 1) | 817, 827 | zmm, ymm, or xmm registers (the vector length is 64 byte, 32 byte, or 16 byte) depending on the vector length field 859B |

In other words, the vector length field 859B selects between a maximum length and one or more other shorter lengths, where each such shorter length is half the length of the preceding length; and instructions templates without the vector length field 859B operate on the maximum vector length. Further, in one example, the class B instruction templates of the specific vector friendly instruction format 900 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the example.

Write mask registers 1015—in the example illustrated, there are 8 write mask registers (k0 through k7), each 64 bits in size. In an alternate example, the write mask registers 1015 are 16 bits in size. As previously described, in one example of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1025—in the example illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1045, on which is aliased the MMX packed integer flat register file 1050—in the example illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative examples of the disclosure may use wider or narrower registers. Additionally, alternative examples of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 11A is a block diagram illustrating both an exemplary in-order pipeline and an exemplary register renaming, out-of-order issue/execution pipeline according to examples of the disclosure. FIG. 11B is a block diagram illustrating both an exemplary example of an in-order architecture core and an exemplary register renaming, out-of-order issue/execution architecture core to be included in a processor according to examples of the disclosure. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one example, the core 1190 includes a microcode ROM or other medium that stores microcode for certain macro-instructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one example, the physical register file(s) unit 1158 comprises a vector registers unit, a write mask registers unit, and a scalar registers unit. These register units may provide architectural vector registers, vector mask registers, and general-purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some examples may include a number of execution units dedicated to specific functions or sets of functions, other examples may include only one execution unit or multiple execution units that all perform all functions. The scheduler unit(s) 1156, physical register file(s) unit(s) 1158, and execution cluster(s) 1160 are shown as being possibly plural because certain examples create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain examples are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary example, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

In certain examples, a prefetch circuit 1178 is included to prefetch data, for example, to predict access addresses and bring the data for those addresses into a cache or caches (e.g., from memory 1180).

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one example, the core 1190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated example of the processor also includes separate instruction and data cache units 1134/1174 and a shared L2 cache unit 1176, alternative examples may have a single internal cache for both instructions and data, such as, for example, a Level 1 (L1) internal cache, or multiple levels of internal cache. In some examples, the system may include a combination of an internal cache and an external cache that is external to the core and/or the processor. Alternatively, all of the cache may be external to the core and/or the processor.

Specific Exemplary In-Order Core Architecture

Figure 12B:
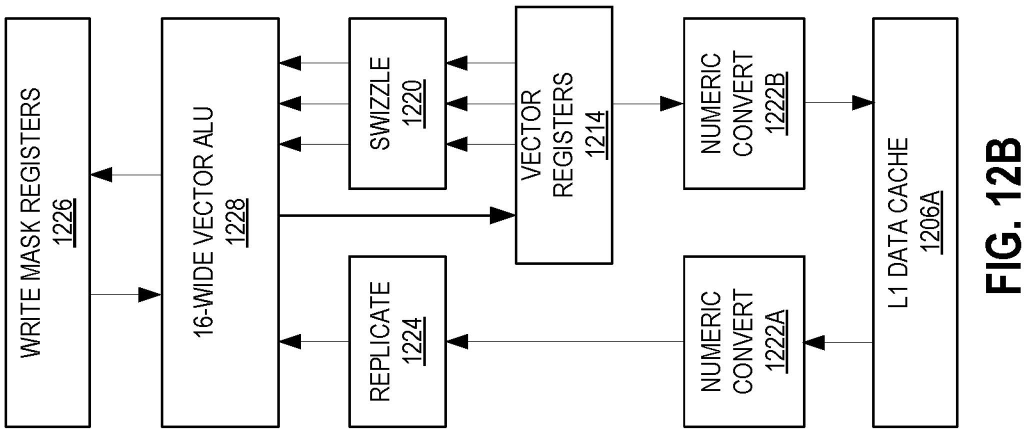
FIG. 12B is an expanded view of part of the processor core in FIG. 12A according to examples of the disclosure.
Figure 12A:
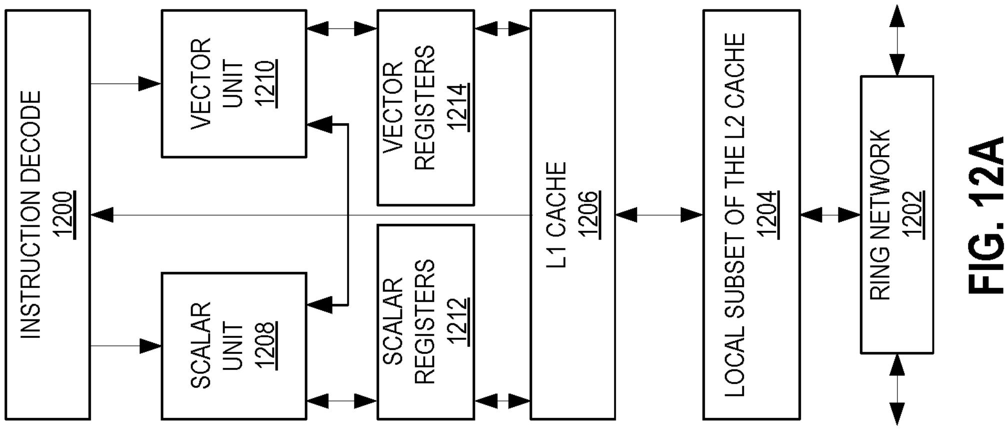
FIG. 12A is a block diagram of a single processor core, along with its connection to the on-die interconnect network and with its local subset of the Level 2 (L2) cache, according to examples of the disclosure.

FIGS. 12A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1202 and with its local subset of the Level 2 (L2) cache 1204, according to examples of the disclosure. In one example, an instruction decode unit 1200 supports the x86 instruction set with a packed data instruction set extension. An L1 cache 1206 allows low-latency accesses to cache memory into the scalar and vector units. While in one example (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative examples of the disclosure may use a different approach (e.g., use a single register set or include a communication path that allow data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to examples of the disclosure. FIG. 12B includes an L1 data cache 1206A part of the L1 cache 1204, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Figure 13:
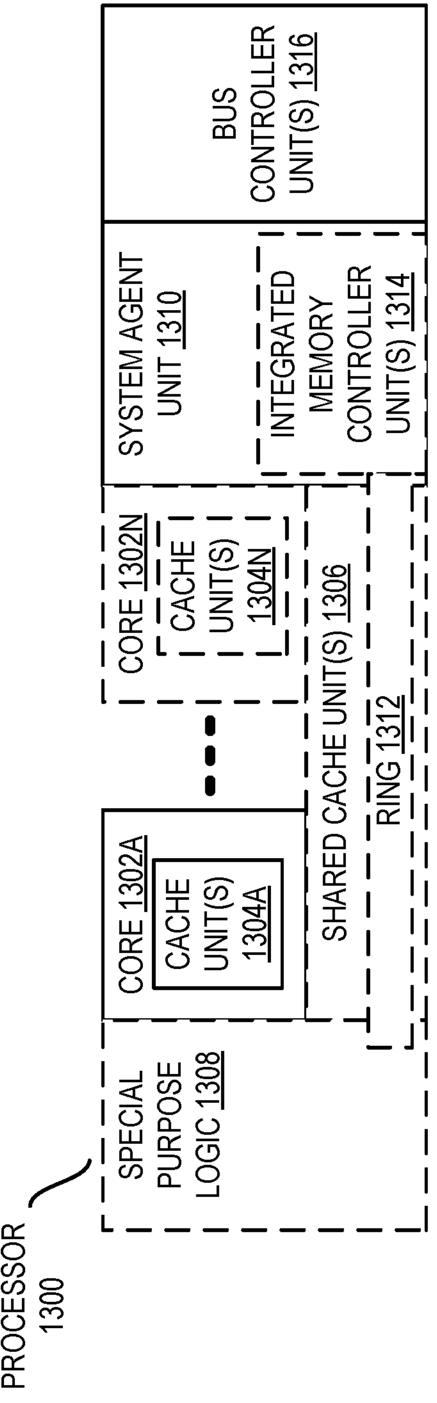
FIG. 13 is a block diagram of a processor that may have more than one core, may have an integrated memory controller, and may have integrated graphics according to examples of the disclosure.

FIG. 13 is a block diagram of a processor 1300 that may have more than one core, may have an integrated memory controller, and may have integrated graphics according to examples of the disclosure. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache 1304A-1304N within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one example a ring-based interconnect unit 1312 interconnects the integrated graphics logic 1308, the set of shared cache units 1306, and the system agent unit 1310/integrated memory controller unit(s) 1314, alternative examples may use any number of well-known techniques for interconnecting such units. In one example, coherency is maintained between one or more cache units 1306 and cores 1302-A-N.

In some examples, one or more of the cores 1302A-N are capable of multi-threading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the integrated graphics logic 1308. The display unit is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set.

Exemplary Computer Architectures

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 14:
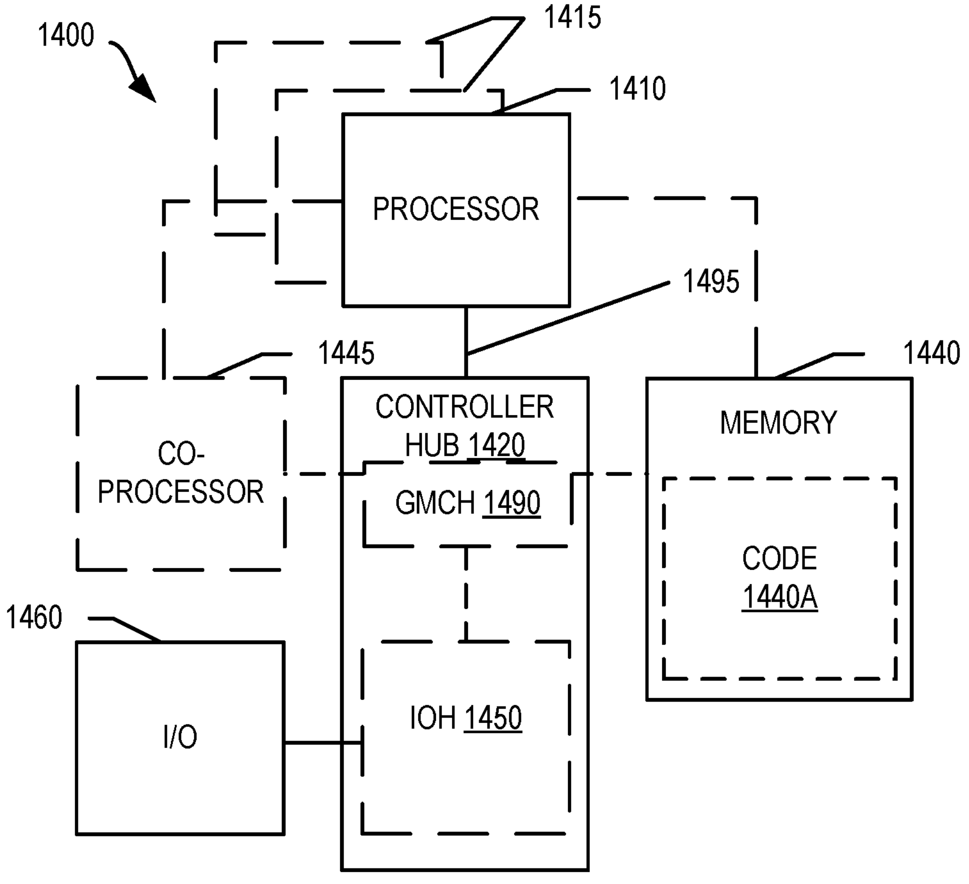
FIG. 14 is a block diagram of a system in accordance with one example of the present disclosure.

Referring now to FIG. 14, shown is a block diagram of a system 1400 in accordance with one example of the present disclosure. The system 1400 may include one or more processors 1410, 1415, which are coupled to a controller hub 1420. In one example the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450. Memory 1440 may include code 1440A, for example, to store code that when executed causes a processor to perform any method of this disclosure.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random-access memory (DRAM), phase change memory (PCM), or a combination of the two. For at least one example, the controller hub 1420 communicates with the processor(s) 1410, 1415 via a multi-drop bus, such as a frontside bus (FSB), point-to-point interface such as Quickpath Interconnect (QPI), or similar connection 1495.

In one example, the coprocessor 1445 is a special-purpose processor, such as, for example, a high-throughput MIC processor, a network or communication processor, compression engine, graphics processor, GPGPU, embedded processor, or the like. In one example, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one example, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor (s) 1445 accept and execute the received coprocessor instructions.

Figure 15:
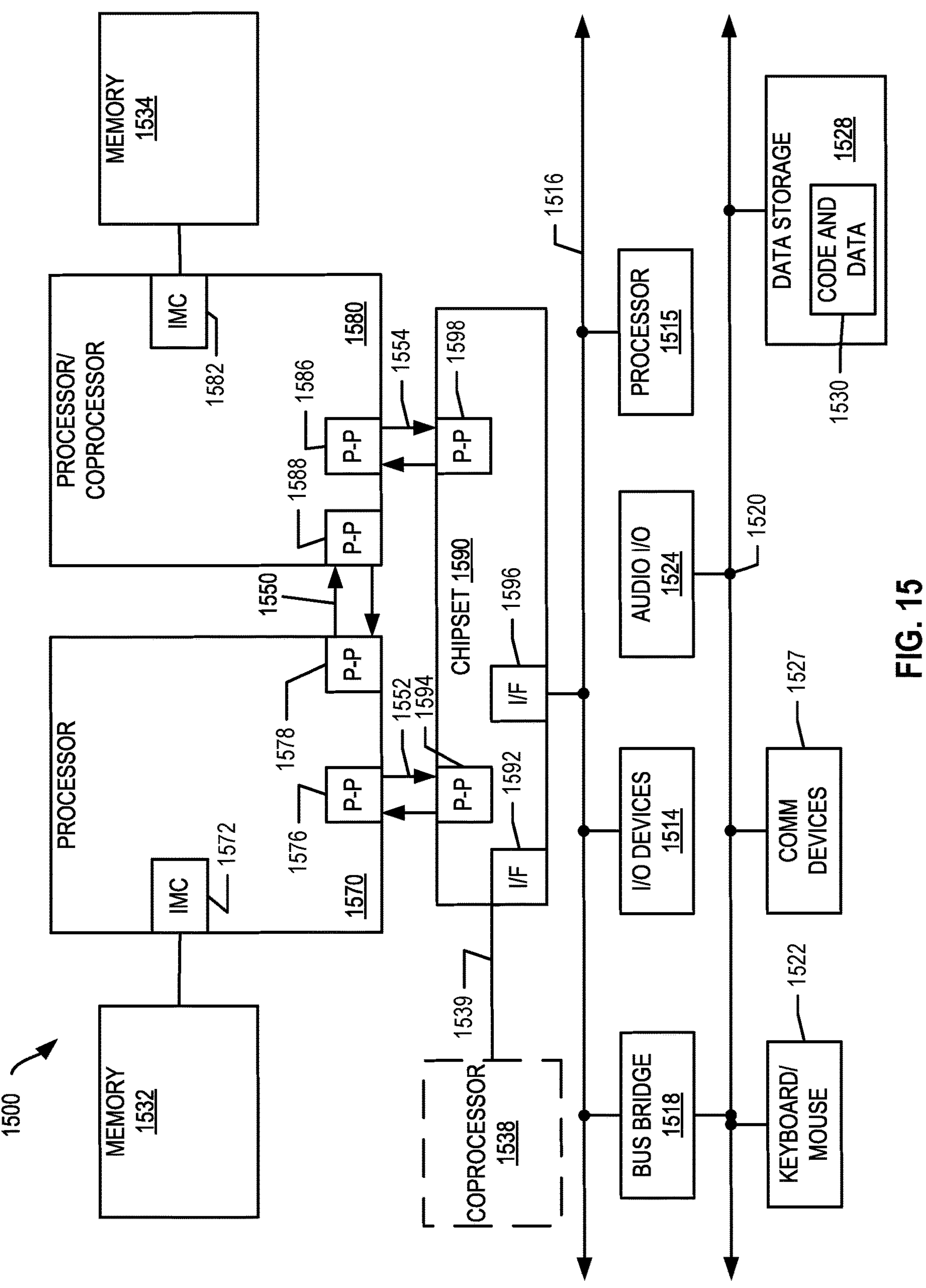
FIG. 15 is a block diagram of a more specific exemplary system in accordance with an example of the present disclosure.

Referring now to FIG. 15, shown is a block diagram of a first more specific exemplary system 1500 in accordance with an example of the present disclosure. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one example of the disclosure, processors 1570 and 1580 are respectively processors 1410 and 1415, while coprocessor 1538 is coprocessor 1445. In another example, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1539. In one example, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one example, first bus 1516 may be a Peripheral Component Interconnect (PCI) bus, or a bus such as a PCI Express bus or another third generation I/O interconnect bus, although the scope of the present disclosure is not so limited.

As shown in FIG. 15, various I/O devices 1514 may be coupled to first bus 1516, along with a bus bridge 1518 which couples first bus 1516 to a second bus 1520. In one example, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one example, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one example. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
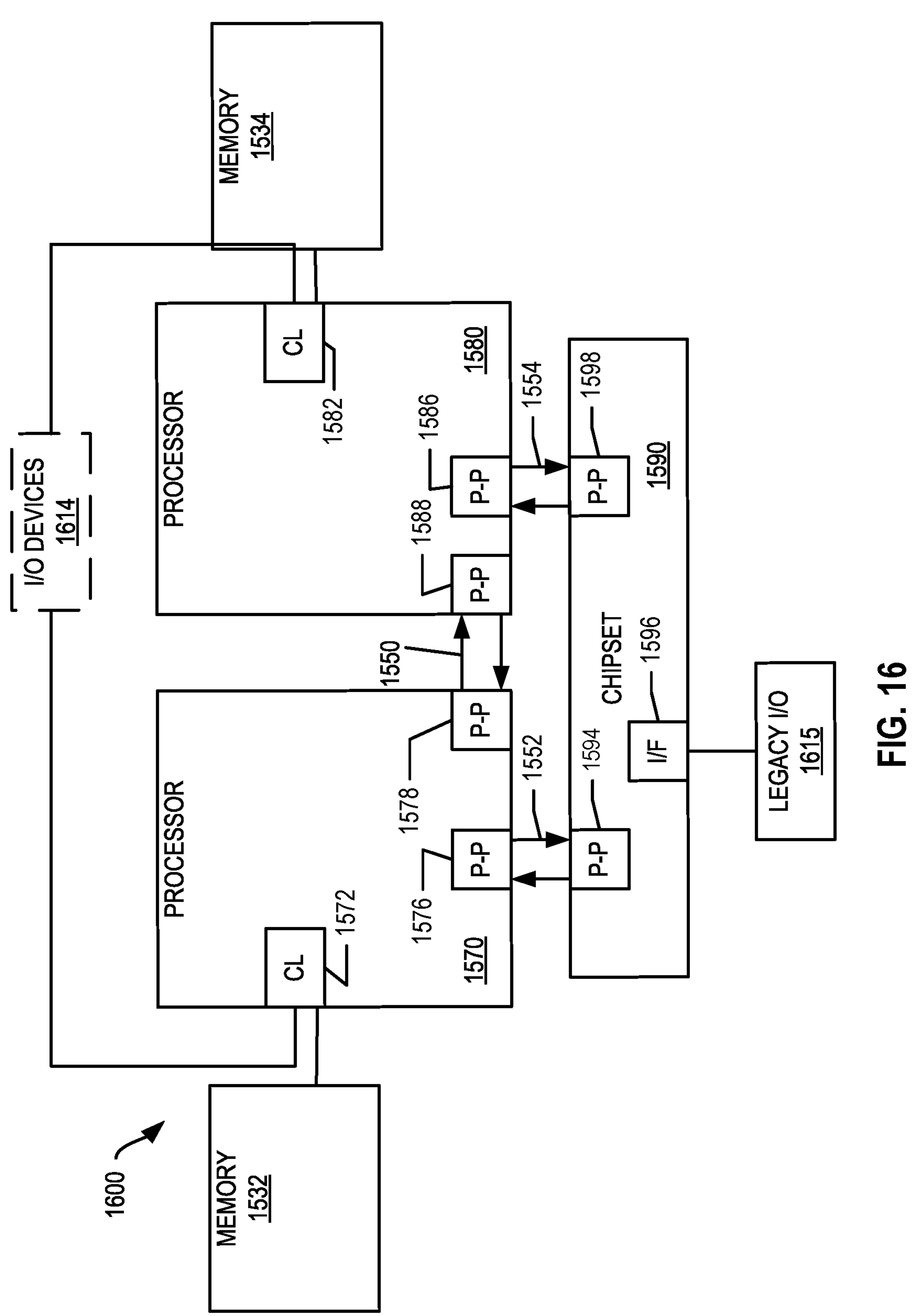
FIG. 16, shown is a block diagram of a second more specific exemplary system in accordance with an example of the present disclosure.

Referring now to FIG. 16, shown is a block diagram of a second more specific exemplary system 1600 in accordance with an example of the present disclosure. Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller units and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
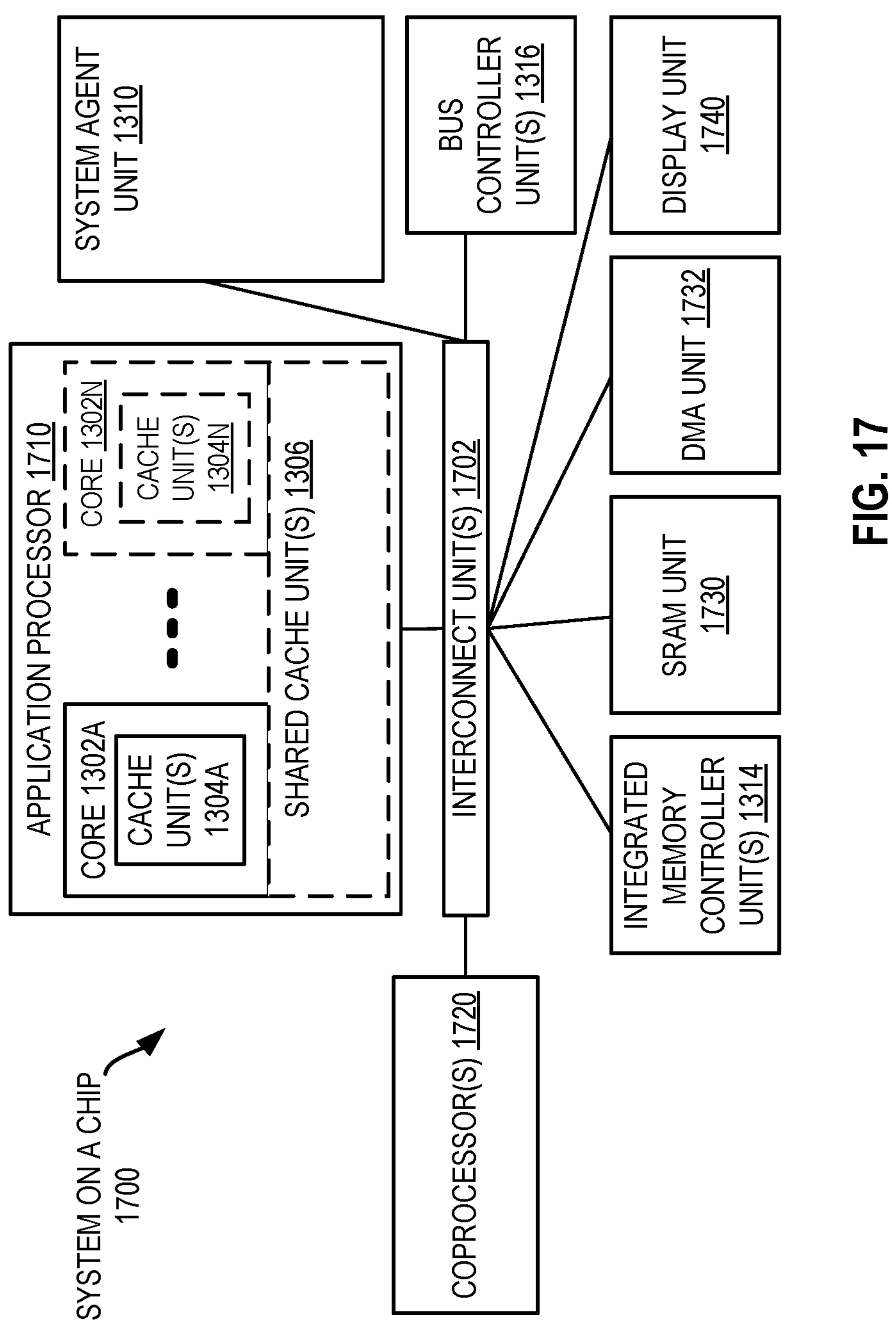
FIG. 17, shown is a block diagram of a system on a chip (SoC) in accordance with an example of the present disclosure.

Referring now to FIG. 17, shown is a block diagram of a SoC 1700 in accordance with an example of the present disclosure. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 1302A-N and shared cache unit(s) 1306; a system agent unit 1310; a bus controller unit(s) 1316; an integrated memory controller unit(s) 1314; a set or one or more coprocessors 1720 which may include integrated graphics logic, an image processor, an audio processor, and a video processor; an static random access memory (SRAM) unit 1730; a direct memory access (DMA) unit 1732; and a display unit 1740 for coupling to one or more external displays. In one example, the coprocessor(s) 1720 include a special-purpose processor, such as, for example, a network or communication processor, compression engine, GPGPU, a high-throughput MIC processor, embedded processor, or the like.

Examples (e.g., of the mechanisms) disclosed herein may be implemented in hardware, software, firmware, or a combination of such implementation approaches. Examples of the disclosure may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples of the disclosure also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
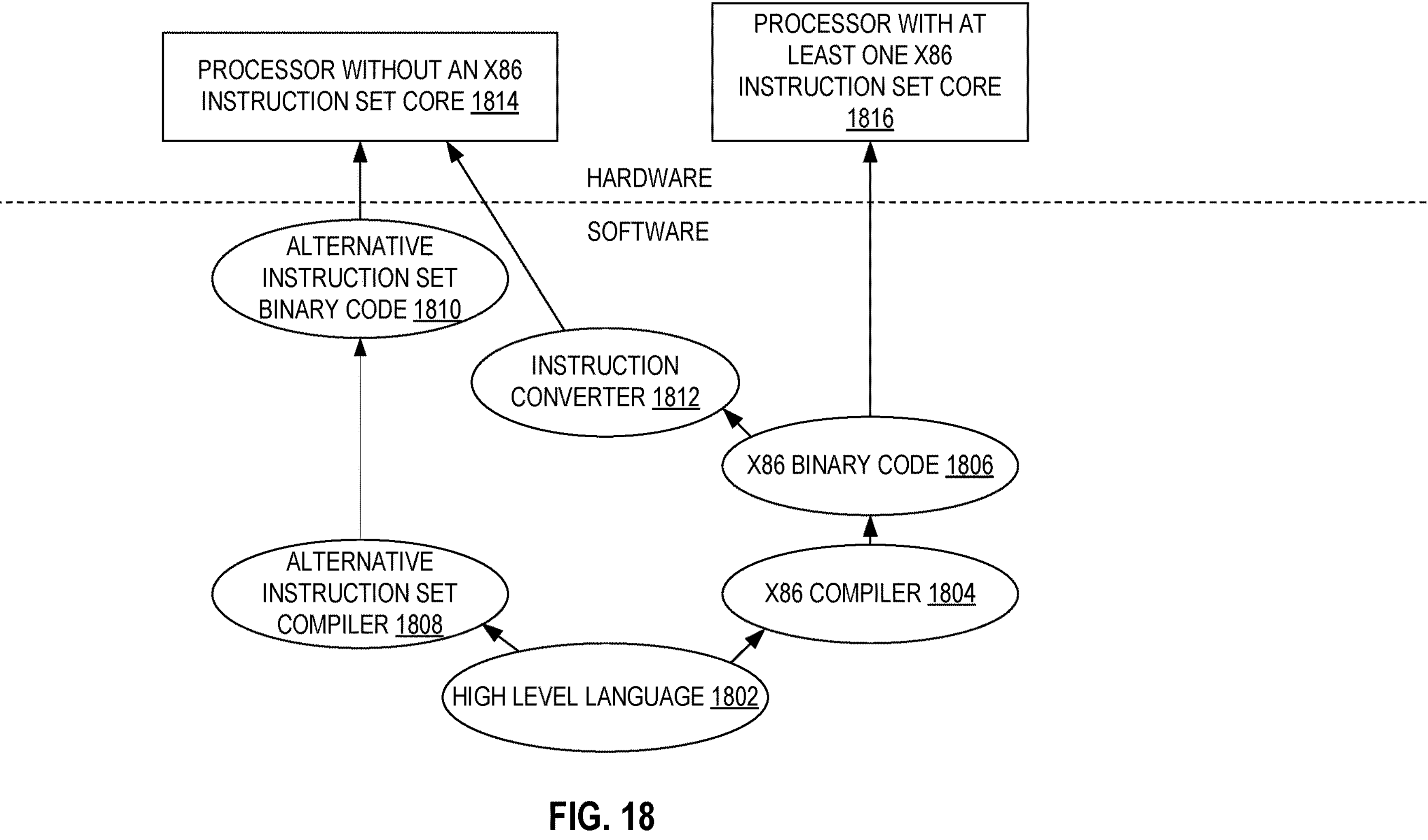
FIG. 18 is a block diagram contrasting the use of a software instruction converter to convert binary instructions in a source instruction set to binary instructions in a target instruction set according to examples of the disclosure.

FIG. 18 is a block diagram contrasting the use of a software instruction converter to convert binary instructions in a source instruction set to binary instructions in a target instruction set according to examples of the disclosure. In the illustrated example, the instruction converter is a software instruction converter, although alternatively the instruction converter may be implemented in software, firmware, hardware, or various combinations thereof. FIG. 18 shows a program in a high-level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, CA and/or that execute the ARM instruction set of ARM Holdings of Sunnyvale, CA). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation, or any other process, allows a processor or other electronic device that does not have an x86 instruction set processor or core to execute the x86 binary code 1806.

What is claimed is:

1. An apparatus comprising:

a decoder circuit to decode a single instruction into a decoded single instruction, the single instruction comprising fields to indicate a memory address that stores a capability comprising an address field, a validity field, and a bounds field that is to indicate a lower bound and an upper bound of an address space to which the capability authorizes access, a single destination register, and an opcode to indicate that an execution circuit is to load a first proper subset of the address field and the bounds field of the capability from the memory address into the single destination register, load a second proper subset of the address field and the bounds field of the capability from the memory address into an implicit second destination register, and load a value of the validity field from the memory address into an implicit third destination register;

the execution circuit to execute the decoded single instruction according to the opcode; and a capability management circuit to check the capability in the single destination register and the implicit second destination register for a memory access request.

2. The apparatus of claim 1, wherein the value of the validity field is loaded into a first proper subset of the implicit third destination register;

the decoder circuit is to decode a second single instruction into a decoded second single instruction, the second single instruction comprising fields to indicate a second memory address that stores a second capability and a fourth single destination register, and an opcode to indicate that the execution circuit is to load a first proper subset of an address field and a bounds field of the second capability from the second memory address into the fourth single destination register, a second proper subset of the address field and the bounds field of the second capability from the second memory address into an implicit fifth destination register, and a value of the validity field from the second memory address into a second proper subset of the implicit third destination register; and the execution circuit to execute the decoded second single instruction according to its opcode.

3. The apparatus of claim 1, wherein the capability management circuit is to clear a value of the validity field loaded into the implicit third destination register in response to detection of a write to either of the single destination register and the implicit second destination register by a non-capability instruction.

4. The apparatus of claim 1, wherein the capability comprises a permission field that is to indicate how the capability is permitted to be used.

5. The apparatus of claim 1, wherein the capability comprises an object type field that is to indicate an object type of the capability.

6. The apparatus of claim 1, wherein the opcode is to indicate that the execution circuit is to lock a memory comprising the memory address until the loads of both the first proper subset of the capability from the memory address into the single destination register, and the second proper subset of the capability from the memory address into the implicit second destination register are complete.

7. The apparatus of claim 1, wherein:

the decoder circuit is to decode a second single instruction into a decoded second single instruction, the second single instruction comprising fields to indicate a second memory address to store a second capability and a single source register, and an opcode to indicate that the execution circuit is to store a first proper subset of an address field and a bounds field of the second capability from the single source register to the second memory address and a second proper subset of the address field and the bounds field of the second capability from an implicit second source register to the second memory address; and the execution circuit to execute the decoded second single instruction according to its opcode.

8. A method comprising:

decoding, by a decoder circuit of a processor core, a single instruction into a decoded single instruction, the single instruction comprising fields to indicate a memory address that stores a capability comprising an address field, a validity field, and a bounds field that is to indicate a lower bound and an upper bound of an address space to which the capability authorizes access, a single destination register, and an opcode to indicate that an execution circuit of the processor core is to load a first proper subset of the address field and the bounds field of the capability from the memory address into the single destination register and load a second proper subset of the address field and the bounds field of the capability from the memory address into an implicit second destination register;

executing, by the execution circuit, the decoded single instruction according to the opcode;

checking, by a capability management circuit of the processor core, the capability in the single destination register and the implicit second destination register for a memory access request;

decoding, by the decoder circuit, a second single instruction into a decoded second single instruction, the second single instruction comprising fields to indicate a second memory address to store a second capability and a single source register, and an opcode to indicate that the execution circuit is to store a first proper subset of an address field and a bounds field of the second capability from the single source register to the second memory address and a second proper subset of the address field and the bounds field of the second capability from an implicit second source register to the second memory address; and executing, by the execution circuit, the decoded second single instruction according to its opcode.

9. The method of claim 8, wherein the opcode is to further indicate that the execution circuit is to load a value of the validity field from the memory address into an implicit third destination register.

10. The method of claim 9, wherein the value of the validity field is loaded into a first proper subset of the implicit third destination register, and further comprising:

decoding, by the decoder circuit, a second single instruction into a decoded second single instruction, the second single instruction comprising fields to indicate a second memory address that stores a second capability and a fourth single destination register, and an opcode to indicate that the execution circuit is to load a first proper subset of an address field and a bounds field of the second capability from the second memory address into the fourth single destination register, a second proper subset of the address field and the bounds field of the second capability from the second memory address into an implicit fifth destination register, and a value of the validity field from the second memory address into a second proper subset of the implicit third destination register; and executing, by the execution circuit, the decoded second single instruction according to its opcode.

11. The method of claim 9, further comprising clearing, by the capability management circuit, a value of the validity field loaded into the implicit third destination register in response to detecting a write to either of the single destination register and the implicit second destination register by a non-capability instruction.

12. The method of claim 8, wherein the capability comprises a permission field that is to indicate how the capability is permitted to be used.

13. The method of claim 8, wherein the capability comprises an object type field that is to indicate an object type of the capability.

14. The method of claim 8, wherein the opcode is to indicate that the execution circuit is to lock a memory comprising the memory address until the loads of both the first proper subset of the capability from the memory address into the single destination register, and the second proper subset of the capability from the memory address into the implicit second destination register are complete.

15. A non-transitory machine readable medium that stores code that when executed by a machine causes the machine to perform a method comprising:

decoding, by a decoder circuit of a processor core, a single instruction into a decoded single instruction, the single instruction comprising fields to indicate a memory address that stores a capability comprising an address field, a validity field, and a bounds field that is to indicate a lower bound and an upper bound of an address space to which the capability authorizes access, a single destination register, and an opcode to indicate that an execution circuit of the processor core is to load a first proper subset of the address field and the bounds field of the capability from the memory address into the single destination register, load a second proper subset of the address field and the bounds field of the capability from the memory address into an implicit second destination register, and load a value of the validity field from the memory address into an implicit third destination register;

executing, by the execution circuit, the decoded single instruction according to the opcode; and checking, by a capability management circuit of the processor core, the capability in the single destination register and the implicit second destination register for a memory access request.

16. The non-transitory machine readable medium of claim 15, wherein the value of the validity field is loaded into a first proper subset of the implicit third destination register, and the method further comprises:

decoding, by the decoder circuit, a second single instruction into a decoded second single instruction, the second single instruction comprising fields to indicate a second memory address that stores a second capability and a fourth single destination register, and an opcode to indicate that the execution circuit is to load a first proper subset of an address field and a bounds field of the second capability from the second memory address into the fourth single destination register, a second proper subset of the address field and the bounds field of the second capability from the second memory address into an implicit fifth destination register, and a value of the validity field from the second memory address into a second proper subset of the implicit third destination register; and executing, by the execution circuit, the decoded second single instruction according to its opcode.

17. The non-transitory machine readable medium of claim 15, wherein the method further comprises clearing, by the capability management circuit, a value of the validity field loaded into the implicit third destination register in response to detecting a write to either of the single destination register and the implicit second destination register by a non-capability instruction.

18. The non-transitory machine readable medium of claim 15, wherein the capability comprises a permission field that is to indicate how the capability is permitted to be used.

19. The non-transitory machine readable medium of claim 15, wherein the capability comprises an object type field that is to indicate an object type of the capability.

20. The non-transitory machine readable medium of claim 15, wherein the opcode is to indicate that the execution circuit is to lock a memory comprising the memory address until the loads of both the first proper subset of the capability from the memory address into the single destination register, and the second proper subset of the capability from the memory address into the implicit second destination register are complete.

21. The non-transitory machine readable medium of claim 15, wherein the method further comprises:

decoding, by the decoder circuit, a second single instruction into a decoded second single instruction, the second single instruction comprising fields to indicate a second memory address to store a second capability and a single source register, and an opcode to indicate that the execution circuit is to store a first proper subset of an address field and a bounds field of the second capability from the single source register to the second memory address and a second proper subset of the address field and the bounds field of the second capability from an implicit second source register to the second memory address; and executing, by the execution circuit, the decoded second single instruction according to its opcode.

* * * * *